(12) United States Patent
Saito et al.

(10) Patent No.: US 12,470,818 B2
(45) Date of Patent: Nov. 11, 2025

(54) IMAGING APPARATUS, IMAGING CONTROL METHOD, AND IMAGING CONTROL PROGRAM WITH MODES FOR FOCUS CONTROL AND TRACKING PROCESSING

(71) Applicant: FUJIFILM Corporation, Tokyo (JP)

(72) Inventors: Taro Saito, Saitama (JP); Takehiro Koguchi, Saitama (JP); Shinya Fujiwara, Saitama (JP); Yukinori Nishiyama, Saitama (JP); Tomoharu Shimada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 242 days.

(21) Appl. No.: 18/320,996

(22) Filed: May 21, 2023

(65) Prior Publication Data

US 2023/0300460 A1 Sep. 21, 2023

Related U.S. Application Data

(63) Continuation of application No. PCT/JP2021/042556, filed on Nov. 19, 2021.

(30) Foreign Application Priority Data

Nov. 26, 2020 (JP) .................. 2020-195915

(51) Int. Cl.
*H04N 23/67* (2023.01)
*G02B 7/28* (2021.01)
(Continued)

(52) U.S. Cl.
CPC ............ *H04N 23/672* (2023.01); *G02B 7/28* (2013.01); *G03B 13/36* (2013.01); *H04N 23/611* (2023.01);
(Continued)

(58) Field of Classification Search
CPC .................. H04N 23/61; H04N 23/611; H04N 23/62–635; H04N 23/667; H04N 23/67;
(Continued)

(56) References Cited

U.S. PATENT DOCUMENTS

| 10,638,049 | B2 | 4/2020 | Ishii et al. | |
| 2011/0158624 | A1* | 6/2011 | Sasaki | H04N 23/611 396/123 |

(Continued)

FOREIGN PATENT DOCUMENTS

| JP | H06205261 | 7/1994 |
| JP | 2004064713 | 2/2004 |

(Continued)

OTHER PUBLICATIONS

"International Search Report (Form PCT/ISA/210) of PCT/JP2021/042556", mailed on Feb. 1, 2022, with English translation thereof, pp. 1-7.

(Continued)

*Primary Examiner* — Twyler L Haskins
*Assistant Examiner* — Akshay Trehan
(74) *Attorney, Agent, or Firm* — JCIPRNET

(57) ABSTRACT

An imaging apparatus includes an imaging optical system, an imaging element, and a processor, in which, in a first focus mode, the processor outputs moving image data captured by the imaging element via the imaging optical system to a display destination, detects an in-focus region in an image represented by the moving image data based on the moving image data, senses, in a case where a focus operation is performed, a termination of the focus operation based on a time related to the focus operation, sets, in a case where the termination of the focus operation is sensed, a subject present in the in-focus region as a tracking target to continuously perform tracking processing and auto focus con- (Continued)

trol, and terminates, in a case where the focus operation is performed again after the tracking processing and the auto focus control are started, the tracking processing and the auto focus control.

25 Claims, 29 Drawing Sheets

(51) Int. Cl.
    *G03B 13/36*    (2021.01)
    *H04N 23/611*   (2023.01)
    *H04N 23/63*    (2023.01)
    *H04N 23/667*   (2023.01)
    *H04N 23/695*   (2023.01)

(52) U.S. Cl.
    CPC ......... *H04N 23/635* (2023.01); *H04N 23/667* (2023.01); *H04N 23/67* (2023.01); *H04N 23/675* (2023.01); *H04N 23/695* (2023.01)

(58) Field of Classification Search
    CPC .. H04N 23/671; H04N 23/672; H04N 23/673; H04N 23/675; H04N 23/58; H04N 23/69; H04N 23/695; G02B 7/28; G03B 13/36
See application file for complete search history.

(56) References Cited

U.S. PATENT DOCUMENTS

| | | | | |
|---|---|---|---|---|
| 2012/0328277 | A1* | 12/2012 | Nakata | G03B 13/32 |
| | | | | 396/131 |
| 2013/0114854 | A1* | 5/2013 | Yoneyama | H04N 23/673 |
| | | | | 382/103 |
| 2020/0221017 | A1* | 7/2020 | Wada | H04N 23/67 |

FOREIGN PATENT DOCUMENTS

| | | |
|---|---|---|
| JP | 2010164637 | 7/2010 |
| JP | 2010199884 | 9/2010 |
| JP | 2011022499 | 2/2011 |
| JP | 2011133821 | 7/2011 |
| JP | 2013007839 | 1/2013 |
| JP | 2013098935 | 5/2013 |
| JP | 2015213254 | 11/2015 |
| JP | 2016201636 | 12/2016 |
| JP | 2018197806 | 12/2018 |
| WO | 2019058973 | 3/2019 |

OTHER PUBLICATIONS

"International Preliminary Report on Patentability (Form PCT/IPEA/ 409) of PCT/JP2021/042556", completed on Jun. 13, 2022, with English translation therof, pp. 1-7.

\* cited by examiner

IMAGING APPARATUS, IMAGING CONTROL METHOD, AND IMAGING CONTROL PROGRAM WITH MODES FOR FOCUS CONTROL AND TRACKING PROCESSING

CROSS-REFERENCE TO RELATED APPLICATIONS

The present application is a Continuation of PCT International Application No. PCT/JP2021/042556 filed on Nov. 19, 2021 claiming priority under 35 U.S.C § 119(a) to Japanese Patent Application No. 2020-195915 filed on Nov. 26, 2020. Each of the above applications is hereby expressly incorporated by reference, in its entirety, into the present application.

BACKGROUND OF THE INVENTION

1. Field of the Invention

The present invention relates to an imaging apparatus, an imaging control method, and an imaging control program, and more particularly to technology for assisting a manual focus operation.

2. Description of the Related Art

JP2018-197806A discloses technology of displaying a focus state of a main subject on a display unit in a case in which a focus operation is manually performed.
JP2004-64713A discloses technology in which, in an imaging apparatus capable of imaging by auto focus (AF) and imaging by manual focus (MF), the AF is stopped in a case in which an MF operation is performed during imaging by the AF. In addition, JP2004-64713A discloses technology of restarting the AF in a case in which the AF is stopped, using a zoom operation or the like as a trigger.
JP1994-205261A (JP-H06-205261A) discloses technology of automatically switching between an AF operation and an MF operation by detecting a contact of a finger with a switch giving an instruction of focusing. In addition, JP1994-205261A (JP-H06-205261A) discloses technology in which, in a case of switching from the MF operation to the AF operation, an in-focus target region designated in the MF operation is set as an in-focus target region of AF processing.

SUMMARY OF THE INVENTION

One embodiment according to the technology of the present disclosure provides an imaging apparatus, an imaging control method, and an imaging control program capable of reducing a burden of a manual focus operation.
(1) An imaging apparatus comprising an imaging optical system, an imaging element, and a processor, in which, in a first focus mode, the processor outputs moving image data captured by the imaging element via the imaging optical system to a display destination, detects an in-focus region in an image represented by the moving image data based on the moving image data, senses, in a case in which a focus operation is performed, a termination of the focus operation based on a time related to the focus operation, sets, in a case in which the termination of the focus operation is sensed, a subject present in the in-focus region as a tracking target to continuously perform tracking processing and auto focus control, and terminates, in a case in which the focus operation is performed again after the tracking processing and the auto focus control are started, the tracking processing and the auto focus control.
(2) The imaging apparatus according to (1), in which the time related to the focus operation is a time of a non-operation state.
(3) The imaging apparatus according to (2), in which the processor measures a duration time of the non-operation state, and senses the termination of the focus operation by sensing that a first time has elapsed from a start of the non-operation state.
(4) The imaging apparatus according to (3), in which the processor records information on the duration time of the non-operation state, and sets the first time based on the recorded information on the duration time of the non-operation state.
(5) The imaging apparatus according to (4), in which the processor sets the first time by calculation using a statistical method based on the recorded information on the duration time of the non-operation state.
(6) The imaging apparatus according to (5), in which the processor calculates an average value, a median value, or a mode value of the duration times of the non-operation states for a most recent prescribed number of times as the first time.
(7) The imaging apparatus according to any one of (1) to (6), in which the processor gives information indicating the in-focus region to the image represented by the moving image data to output the moving image data to the display destination.
(8) The imaging apparatus according to (7), in which the processor changes a content of the information indicating the in-focus region according to sensing of the termination of the focus operation.
(9) The imaging apparatus according to any one of (1) to (8), in which the processor senses a movement direction of a focus immediately before the termination of the focus operation is sensed, and limits a movement direction of a focus by the auto focus control to the sensed movement direction in a period from starts of the tracking processing and the auto focus control until a second time elapses.
(10) The imaging apparatus according to any one of (1) to (9), in which the processor acquires information on a posture of an apparatus body, and terminates, in a case in which the posture of the apparatus body is changed after the tracking processing and the auto focus control are started, the tracking processing and the auto focus control.
(11) The imaging apparatus according to any one of (1) to (10), in which, in a case in which a plurality of the subjects are set as the tracking targets, the processor calculates a movement amount of each of the subjects, and sets the tracking target based on the calculated movement amount.
(12) The imaging apparatus according to (11), in which the processor sets the subject having no movement or the subject having a smallest movement amount as the tracking target.
(13) The imaging apparatus according to (11) or (12), in which the movement amount includes a movement amount of the imaging optical system in an optical axis direction, and in a case in which it is determined that all the subjects have movement, the processor sets the subject having a smallest movement amount in the optical axis direction as the tracking target.

(14) The imaging apparatus according to (13), in which, in a case in which it is determined that all the subjects have movement and information on the movement amount in the optical axis direction is not able to be acquired, the processor cancels setting of the tracking target for all the subjects.

(15) The imaging apparatus according to any one of (1) to (10), in which the processor detects a focus state of the subject included in the moving image data based on the moving image data, and sets the tracking target based on the focus state of the subject during the focus operation.

(16) The imaging apparatus according to (15), in which the processor sets the subject, which is changed from an in-focus state to an out-of-focus state during the focus operation and then restored to the in-focus state, as the tracking target.

(17) The imaging apparatus according to (16), in which, in a case in which the subject, which is changed from the in-focus state to the out-of-focus state during the focus operation and then restored to the in-focus state, is not present, the processor sets the subject having a longest period of the in-focus state during the focus operation as the tracking target.

(18) The imaging apparatus according to (15), in which the processor sets the subject having a longest period of an in-focus state during the focus operation as the tracking target.

(19) The imaging apparatus according to any one of (1) to (18), in which, after the tracking processing and the auto focus control are started, the processor calculates focus evaluation values of a plurality of regions in a screen based on the moving image data, extracts the region in which the same degree of the focus evaluation value as the focus evaluation value of the tracking target is maintained for a third time, and newly adds and sets the subject present in the extracted region as the tracking target.

(20) An imaging control method comprising detecting an in-focus region in an image represented by moving image data captured by an imaging element via an imaging optical system based on the moving image data, sensing, in a case in which a focus operation is performed, a termination of the focus operation based on a time related to the focus operation, setting, in a case in which the termination of the focus operation is sensed, a subject present in the in-focus region as a tracking target to continuously perform tracking processing and auto focus control, and terminating, in a case in which the focus operation is performed again after the tracking processing and the auto focus control are started, the tracking processing and the auto focus control.

(21) An imaging control program causing a computer to realize a function of detecting an in-focus region in an image represented by moving image data captured by an imaging element via an imaging optical system based on the moving image data, a function of sensing, in a case in which a focus operation is performed, a termination of the focus operation based on a time related to the focus operation, a function of setting, in a case in which the termination of the focus operation is sensed, a subject present in the in-focus region as a tracking target to continuously perform tracking processing and auto focus control, and a function of terminating, in a case in which the focus operation is performed again after the tracking processing and the auto focus control are started, the tracking processing and the auto focus control.

DESCRIPTION OF THE PREFERRED EMBODIMENTS

Hereinafter, description of preferred embodiments of the present invention will be made in detail with reference to the accompanying drawings.

First Embodiment

A focus cannot be changed later by editing. Therefore, the adjustment of the focus is particularly important in a case of imaging of a moving image. However, in low-budget imaging, there are many cases in which there is only one cameraman (so-called one-man operation). In this case, the cameraman needs to perform a wide range of the adjustment of the focus, an angle of view, an exposure, and white balance by himself, which is extremely burdensome. Although AF can be used for the focus adjustment, it is required to appropriately set a focus area in order to accurately perform focusing by the AF. However, in a case of one-man operation or the like, it is required to perform other operations in parallel, and there is a problem that a momentary time lag occurs. Hereinafter, an imaging apparatus capable of reducing a load of the MF operation by a user will be described.

[Apparatus Configuration]

Figure 1:
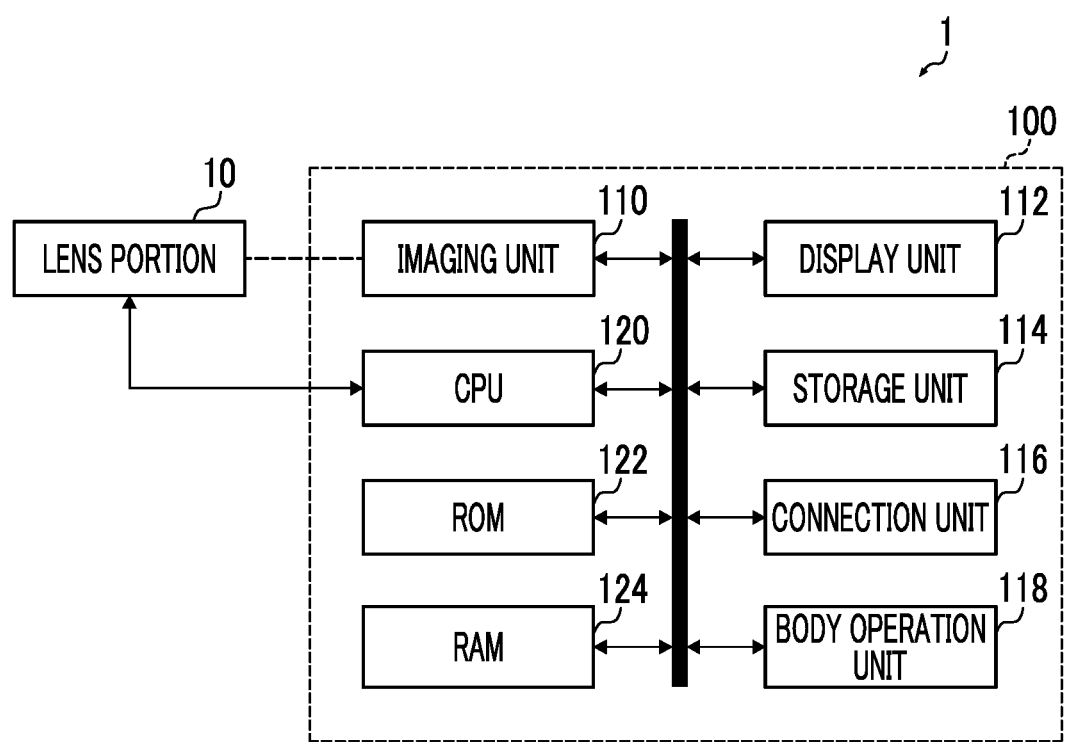
FIG. 1 is a diagram showing a schematic configuration of an imaging apparatus.

FIG. 1 is a diagram showing a schematic configuration of the imaging apparatus according to the present embodiment.

As shown in FIG. 1, an imaging apparatus 1 according to the present embodiment includes a lens portion 10 and a body part 100. The lens portion 10 may be integrated with the body part 100 or may be configured to be detachable (replaceable).

Figure 2:
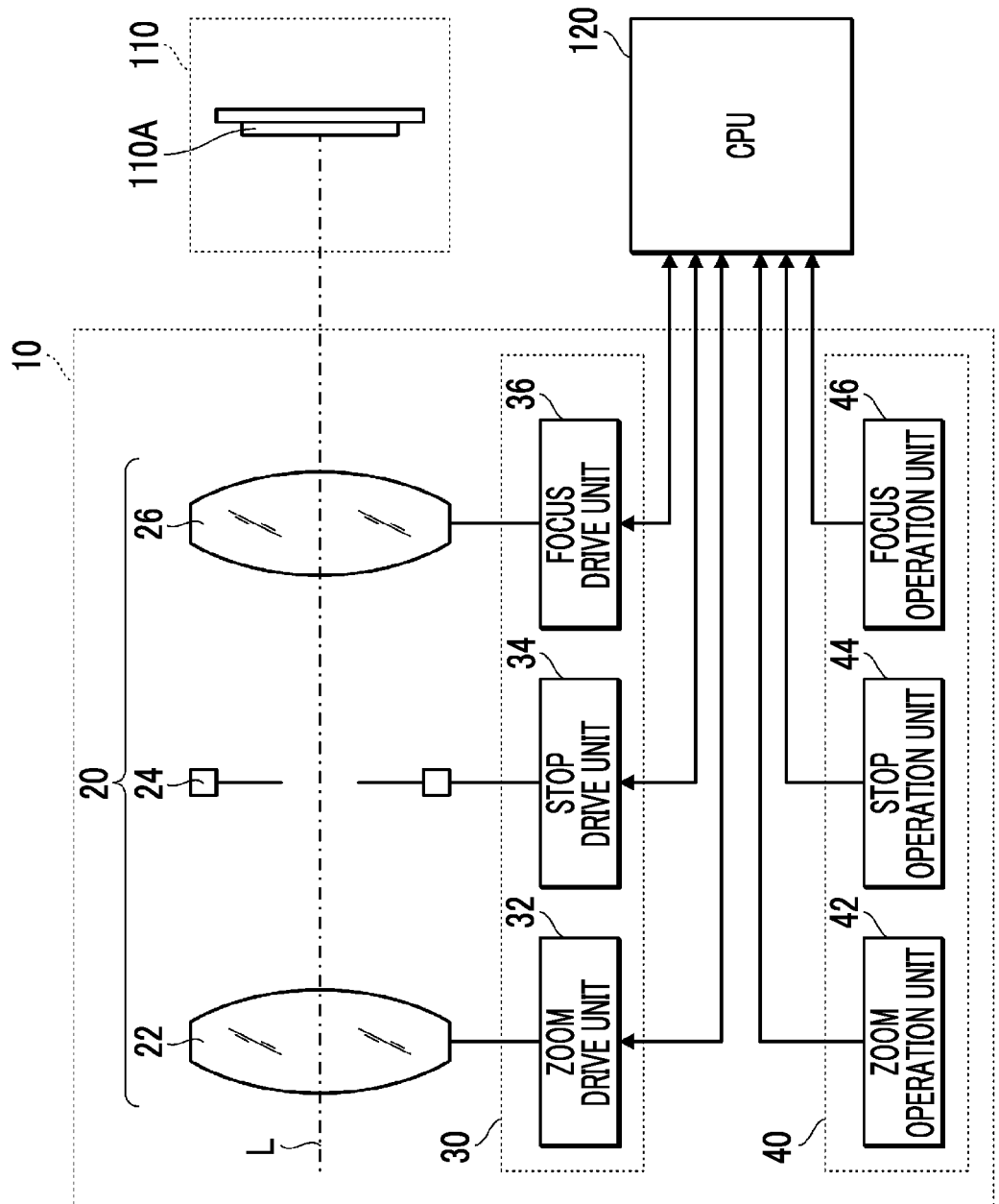
FIG. 2 is a diagram showing a schematic configuration of a lens portion.

FIG. 2 is a diagram showing a schematic configuration of the lens portion.

As shown in FIG. 2, the lens portion 10 includes an imaging optical system 20, a lens drive unit 30, a lens operation unit 40, and the like.

In the present embodiment, the imaging optical system 20 is composed of a zooming optical system and includes a zoom lens 22, a stop 24, and a focus lens 26. It should be noted that, as a unit for adjusting an amount of light, instead of the stop 24 or in addition to the stop 24, a dimming filter or a neutral density (ND) filter which is a kind of the dimming filter can be provided. The zoom lens 22 and the focus lens 26 are composed of at least one lens.

The lens drive unit 30 includes a zoom drive unit 32, a stop drive unit 34, and a focus drive unit 36.

The zoom drive unit 32 is a drive unit of the zoom lens 22. The zoom drive unit 32 includes an actuator (not shown) that drives the zoom lens 22, a drive circuit (not shown) for the actuator, and a sensor (not shown) that detects a position of the zoom lens 22. As the actuator, for example, a DC motor, a linear motor, a stepping motor, an ultrasound motor, or the like is used. The zoom lens 22 is driven by the zoom drive unit 32 to move back and forth along an optical axis L. As a result, a focal length (angle of view) is changed.

The stop drive unit 34 is a drive unit of the stop 24. The stop drive unit 34 includes an actuator (not shown) that drives the stop 24 and a drive circuit (not shown) for the actuator. As the actuator, for example, a DC motor, a linear motor, a stepping motor, an ultrasound motor, or the like is used. The stop 24 is driven by the stop drive unit 34 to change an opening diameter thereof. As a result, an amount of light passing through the imaging optical system 20 is changed.

The focus drive unit 36 is a drive unit of the focus lens 26. The focus drive unit 36 includes an actuator (not shown) that drives the focus lens 26, a drive circuit (not shown) for the actuator, and a sensor (not shown) that detects a position of the focus lens 26. As the actuator, for example, a DC motor, a linear motor, a stepping motor, an ultrasound motor, or the like is used. The focus lens 26 is driven by the focus drive unit 36 to move back and forth along the optical axis L. As a result, a focus position is changed.

The lens operation unit 40 includes a zoom operation unit 42, a stop operation unit 44, and a focus operation unit 46.

The zoom operation unit 42 includes a zoom ring (not shown) as an operation member and a sensor (not shown) that detects a position of the zoom ring. The zoom ring is rotatably provided on an outer periphery of a lens barrel. Information on the position of the zoom ring detected by the sensor is output to a CPU 120. The CPU 120 controls the driving of the zoom lens 22 based on the acquired information on the position of the zoom ring. It should be noted that, in the present embodiment, a configuration is adopted in which a zoom operation is performed by the zoom ring, but a configuration can also be adopted in which the zoom operation is performed by a lever operation, a knob operation, or the like.

The stop operation unit 44 includes a stop ring (not shown) as an operation member and a sensor (not shown) that detects a position of the stop ring. The stop ring is rotatably provided on the outer periphery of the lens barrel. Information on the position of the stop ring detected by the sensor is output to the CPU 120. The CPU 120 controls the driving of the stop 24 based on the acquired information on the position of the stop ring.

The focus operation unit 46 is an operation unit of the focus. The focus operation unit 46 includes a focus ring (not shown) as an operation member and a sensor (not shown) that detects a position of the focus ring. The focus ring is rotatably provided on the outer periphery of the lens barrel. Information on the position of the focus ring detected by the sensor is output to the CPU 120. In an MF mode, the CPU 120 controls the driving of the focus lens 26 based on the acquired information on the position of the focus ring. The MF mode is an operation mode in which the focus adjustment is manually performed. The operation mode of the focus adjustment (focus mode) includes the MF mode and an AF mode, and is selected by a user. The AF mode is an operation mode in which the focus adjustment is automatically performed. The focus mode is selected by a body operation unit 118. A configuration can also be adopted in which the focus operation is performed by a lever operation, a knob operation, or the like.

As shown in FIG. 1, the body part 100 includes an imaging unit 110, a display unit 112, a storage unit 114, a connection unit 116, the body operation unit 118, the central processing unit (CPU) 120, a read only memory (ROM) 122, and a random access memory (RAM) 124.

The imaging unit 110 comprises an imaging element 110A that converts an optical image into an electrical signal (see FIG. 2). As the imaging element 110A, for example, a complementary metal oxide semiconductor (CMOS) image sensor having a predetermined color filter arrangement (for example, a Bayer arrangement or the like), a charged coupled device (CCD) image sensor, or the like is used.

In the imaging apparatus 1 according to the present embodiment, the CMOS image sensor comprising a drive unit, an analog-to-digital converter (ADC), a signal processing unit, and the like is used as the imaging element 110A. In this case, the imaging element 110A is operated by being driven by the built-in drive unit. In addition, a signal of each pixel is converted into a digital signal by the built-in ADC and output. Further, the signal of each pixel is output by being subjected to signal processing, such as sampling two correlation pile processing, gain processing, and correction processing, by the built-in signal processing unit. It should be noted that a configuration may be adopted in which the signal processing is performed on a signal before being converted into the digital signal or a configuration may be adopted in which the signal processing is performed on a signal after being converted into the digital signal.

In addition, in the imaging apparatus 1 according to the present embodiment, the imaging element 110A in which a phase-difference detection pixel is incorporated is used as the imaging element 110A. Information on a phase difference of a subject in a screen can be acquired by using the imaging element 110A in which the phase-difference detection pixel is incorporated. In addition, a focus deviation direction and a focus deviation amount (defocus amount) of the subject in the screen can be detected from the acquired information on the phase difference. Since the imaging element 110A in which the phase-difference detection pixel is incorporated and a phase-difference detection method using the imaging element 110A are known technology, the description of the details thereof will be omitted.

The imaging of the moving image is performed at a predetermined frame rate. The frame rate may be fixed or may be configured to be optionally settable by the user.

The display unit 112 is configured by a display, such as a liquid crystal display (LCD) or an organic EL display (organic light emitting diode display, OLED display). The display unit 112 can also be configured by a touch panel display comprising a touch panel on a display surface thereof. In addition, the display unit 112 also includes a form of an electronic view finder (EVF). The display unit 112 is used for displaying the live view and is also used as a graphical user interface (GUI) or the like for performing various settings. In addition, in a case in which the display unit 112 is configured by the touch panel display, the display unit 112 also functions as an operation unit. It should be noted that, in a case in which an external display device is connected to the connection unit 116 described later, the external display device also functions as the display unit 112.

The storage unit 114 is used as a storage region for the captured moving image data and is also used as a storage region for various data. The storage unit 114 is configured by, for example, a non-volatile semiconductor memory, such as an electrically erasable programmable read-only memory (EEPROM) including a flash memory, or a solid state drive (SSD) in which these semiconductor memories are built. The storage unit 114 may be configured to be integrally provided in an apparatus body (form of a so-called built-in memory) or may be configured to be attachable to and detachable from the apparatus body (form of a so-called memory card). In addition, a form may be adopted in which storage unit 114 is connected to be communicable by wire or wirelessly. In addition, in a case in which an external storage device is connected to the connection unit 116 described later, the external storage device also functions as the storage unit 114.

The connection unit 116 is used for the connection of an external apparatus (for example, an external display device or an external storage device). The connection unit 116 comprises at least one terminal. As a connection standard, for example, a high-definition multimedia interface (HDMI) or the like can be adopted (HDMI is a registered trademark).

The body operation unit 118 comprises various operation members for operating the imaging apparatus 1. The operation member includes various operation buttons, such as a power button for giving an instruction to turn on and off of a power source and a recording button for giving an instruction to start and terminate recording. In addition, in a case in which the display unit 112 is configured by the touch panel display, the touch panel is also provided in the body operation unit 118.

As described above, the focus mode is selected by the body operation unit 118. The body operation unit 118 comprises a focus mode selector switch as a unit for selecting the focus mode. The focus mode selector switch selectively switches between the MF mode and the AF mode. It should be noted that a configuration can also be adopted in which the focus mode is selected (set) by using a setting screen or the like.

The CPU 120 is an example of a processor. The CPU 120 functions as a control unit, an image processing unit, and the like of the imaging apparatus 1 by executing a predetermined program (imaging control program).

The control performed by the CPU 120 includes, in addition to imaging control, display control, recording control, and the like. The imaging control includes, in addition to driving control of the lens portion 10 and the imaging unit 110, sensing, detection, and calculation processing of information required for the control. The sensing, detection, and calculation processing of the information required for control includes, for example, detection or calculation processing of brightness required for controlling the exposure, detection or calculation processing of a focus evaluation value required for the AF control, and the like. In addition, in a case in which the tracking AF is performed, tracking processing is also included. The tracking AF is one of the functions of the AF, and is a function of automatically tracking and continuously performing focusing even in a case in which the subject moves. In the tracking AF, as the tracking processing, processing of setting the focus area according to the movement of the subject, which is a tracking target, is performed. In the imaging apparatus 1 according to the present embodiment, in the MF mode, in a case in which the termination of the focus operation is sensed, the subject which is in focus by the MF is set as the tracking target, and the tracking AF is automatically started. The tracking AF is continuously performed until the focus operation is performed again. The present processing will be described in more detail later. The MF mode is an example of a first focus mode.

In addition, the image processing performed by the CPU 120 includes, in addition to generation processing of moving image data for record and display (live view), compression processing of the moving image data for record, and the like. The moving image data for record and display are generated by performing predetermined image processing (so-called development treatment) on RAW data (raw moving image data output from the imaging unit 110). Here, the image processing includes offset processing, gamma correction processing, demosaicing processing, RGB/YCrCb conversion processing, white balance processing, and the like. Since these pieces of processing are known processing, the description of the details thereof will be omitted. The compression processing is processing of generating a moving image file in a predetermined compression format. A well-known codec can be adopted as the codec in a case of the compression. For example, the codec standardized by moving picture experts group (MPEG) (MPEG-1, MPEG-2, MPEG-4, or the like) or the like can be adopted.

It should be noted that a configuration can also be adopted in which a part or all of the processing performed by the CPU 120 are performed by hardware provided inside the CPU 120.

The ROM 122 stores a program executed by the CPU 120 and various data required for control or the like. It should be noted that a memory configuring the ROM 122 includes the EEPROM including the flash memory.

The RAM 124 is used as a work region in a case in which the CPU 120 performs various types of processing.

[Control Function of Imaging in MF Mode]

As described above, in the imaging apparatus 1 according to the present embodiment, in the MF mode, in a case in which the user (cameraman) performs focusing on a desired subject and terminates the focus operation, the subject which is in focus is set as the tracking target, and the tracking AF is automatically started. Then, in a case in which the user operates the focus again, the tracking AF is terminated, and the switching to the operation in the normal MF mode is performed.

Figure 3:
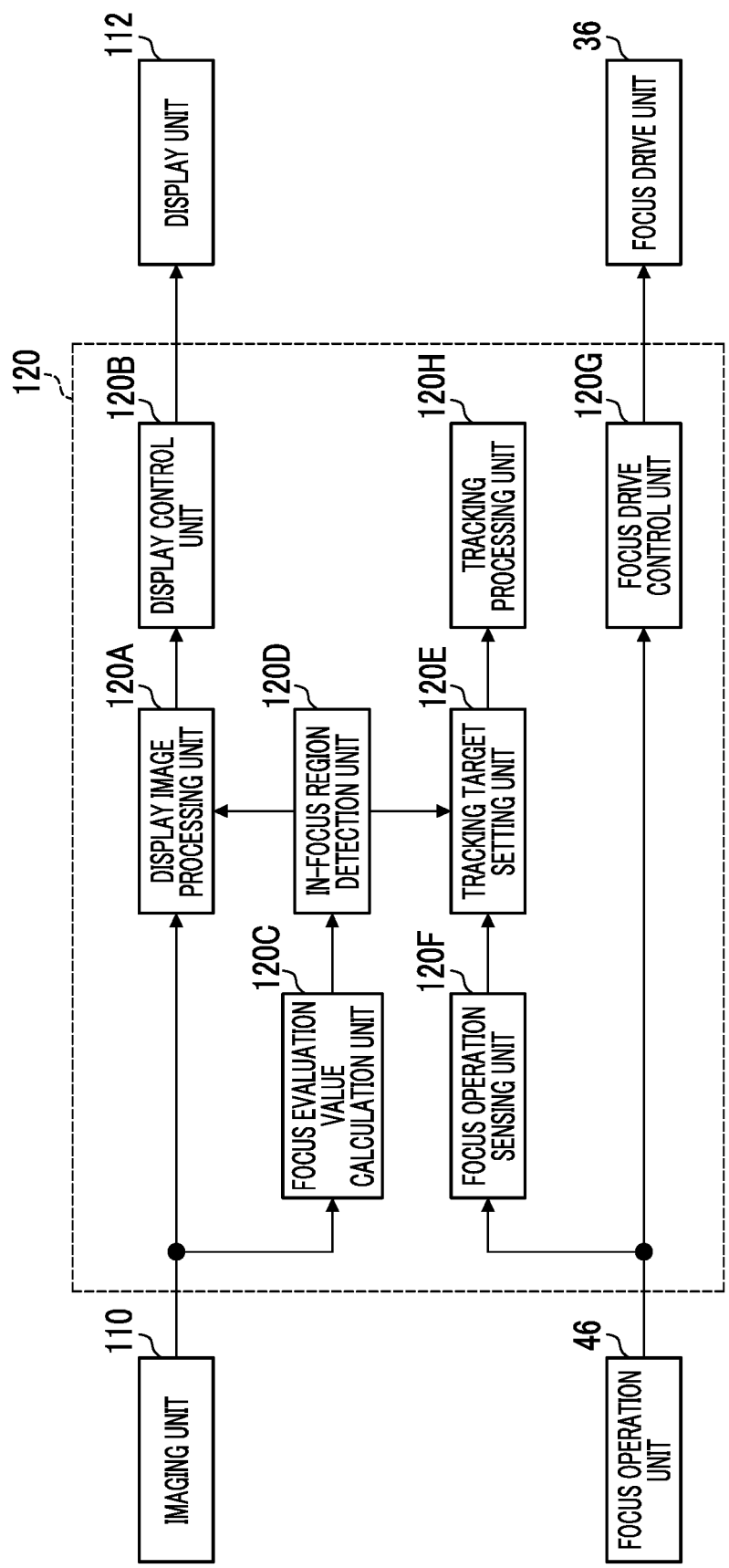
FIG. 3 is a block diagram of functions realized by a CPU in an MF mode.
Figure 4:
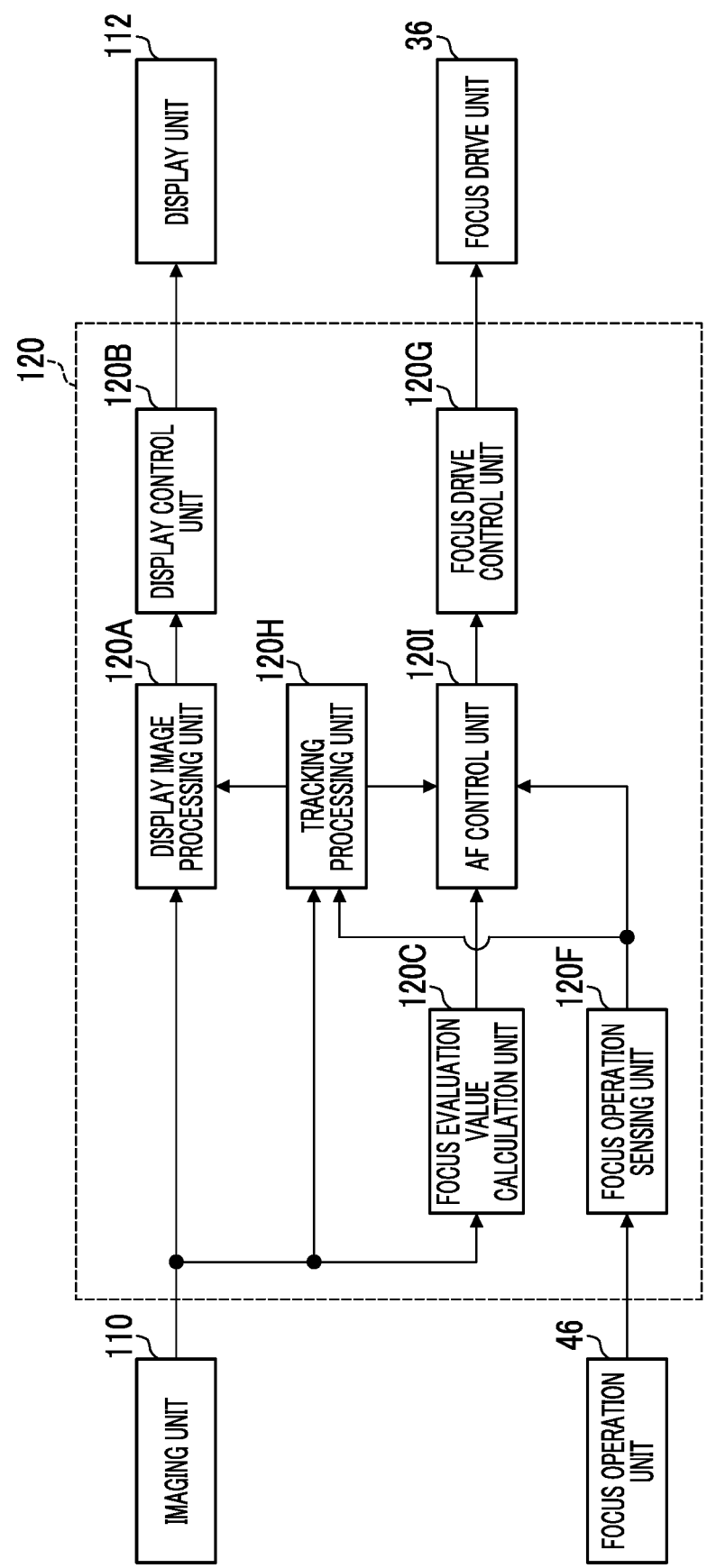
FIG. 4 is a block diagram of the functions realized by the CPU in the MF mode.

FIGS. 3 and 4 are block diagrams of functions realized by the CPU in the MF mode. FIG. 3 is a block diagram of functions mainly realized in a case in which the focus operation is manually performed. That is, FIG. 3 is a block diagram of functions realized in the normal MF mode. In addition, FIG. 4 is a block diagram of functions mainly realized in a case of the tracking AF is performed.

As shown in FIGS. 3 and 4, in the MF mode, the CPU 120 functions as a display image processing unit 120A, a display control unit 120B, a focus evaluation value calculation unit 120C, an in-focus region detection unit 120D, a tracking target setting unit 120E, a focus operation sensing unit 120F, a focus drive control unit 120G, a tracking processing unit 120H, and an AF control unit 120I.

The display image processing unit 120A processes the moving image data (RAW data) output from the imaging unit 110 to generate the moving image data for display.

Figure 5:
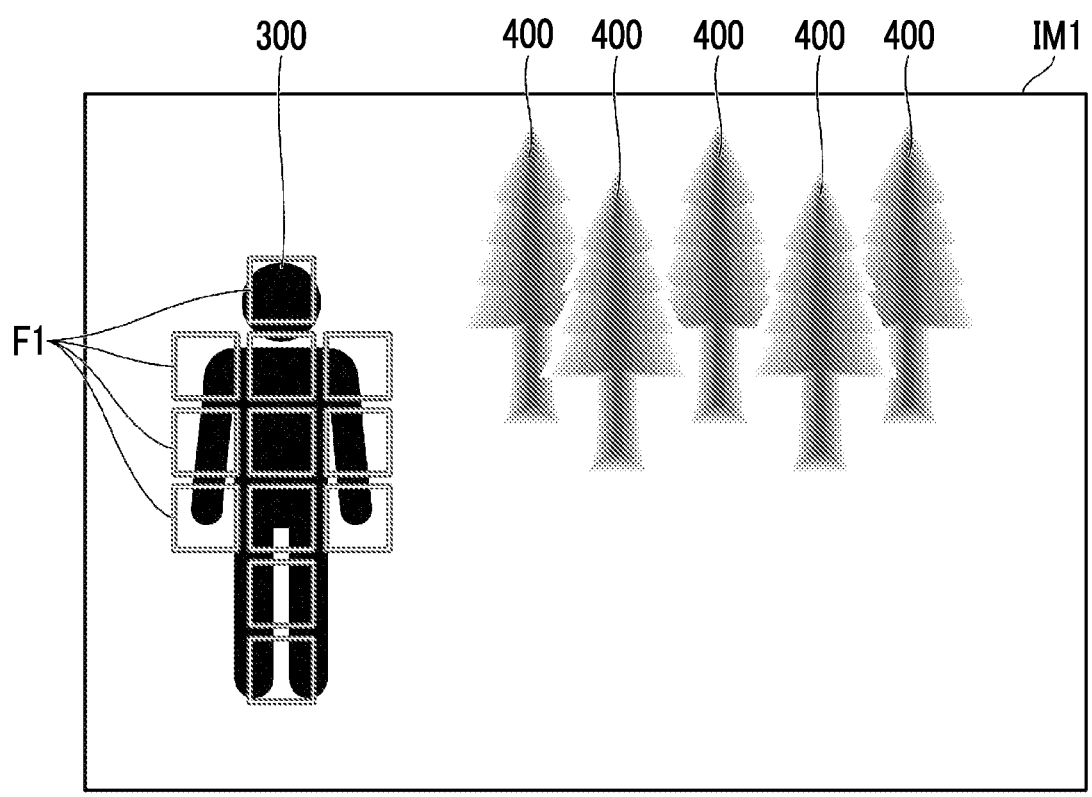
FIG. 5 is a diagram showing one frame of a moving image displayed on a display unit during a focus operation.

FIG. 5 is a diagram showing one frame of the moving image displayed on the display unit during the focus operation. FIG. 5 shows an example of an image displayed on the display unit 112 in a case in which the imaging is performed by focusing on a person 300 in the foreground. A tree 400 in the background is imaged with blurriness.

As shown in FIG. 5, information indicating an in-focus region is given to an image IM1 displayed during the focus operation. In the present embodiment, a frame F1 of the focus area in an in-focus state is displayed as the information indicating the in-focus region. More specifically, the frame F1 of the focus area in the in-focus state is displayed in a superimposed manner on an image of the live view. The frame F1 is displayed in a predetermined color. In the present embodiment, the frame F1 of the focus area in the in-focus state is displayed in red. The description of the focus area will be made later.

The display image processing unit 120A generates the moving image data for display based on the information on the in-focus region detected by the in-focus region detection unit 120D during the focus operation. The description of the detection of the in-focus region will be made later.

Figure 6:
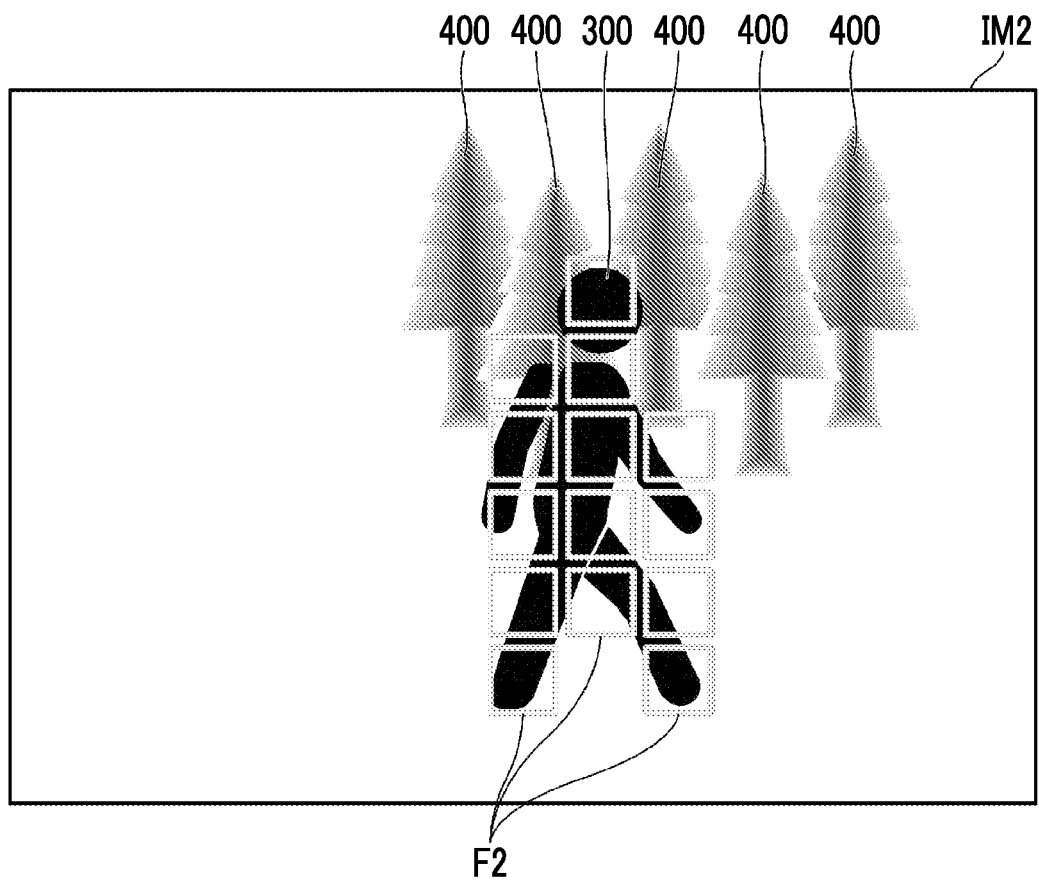
FIG. 6 is a diagram showing one frame of a moving image displayed on a display unit during tracking AF.

FIG. 6 is a diagram showing one frame of the moving image displayed on the display unit during the tracking AF. FIG. 6 shows an example of an image displayed on the display unit 112 in a case in which the person 300 in the foreground is set as the tracking target.

In the tracking AF, the subject set as the tracking target is continuously in focus. In an image IM2 displayed during the tracking AF, a frame F2 of the focus area in which the subject which is the tracking target is present is displayed in a predetermined color. This color is different from the color (red) of the frame F1 indicating the in-focus region during the focus operation. In the present embodiment, the frame F2 is displayed in green. In this way, during the tracking AF, a frame indicating the tracking target is displayed in a color different from the color during the focus operation. As a result, the tracking target can be recognized from the image displayed on the display unit 112, and simultaneously, it is possible to recognize that the tracking AF is in progress. It should be noted that, since the tracking target during the tracking AF is continuously in focus, the focus area in which the subject of the tracking target is present is substantially the in-focus region. Accordingly, the frame F2 of the focus area in which the subject which is the tracking target is present is also the information indicating the in-focus region.

The display image processing unit 120A generates the moving image data for display based on information on a focus target area set by the tracking processing unit 120H during the tracking AF. The description of the focus target area will be made later.

The display control unit 120B causes the display unit 112 to display the moving image data for display generated by the display image processing unit 120A. The display unit 112 is an example of a display destination. It should be noted that, in a case in which the external display device is connected to the connection unit 116, the moving image data for display is also displayed on the external display device. In this case, a configuration may be adopted in which the display of the display unit 112 is turned off. Also, a configuration may be adopted in which other information is displayed.

The focus evaluation value calculation unit 120C calculates a focus evaluation value of the focus area set in advance based on the moving image data captured by the imaging unit 110.

Figure 7:
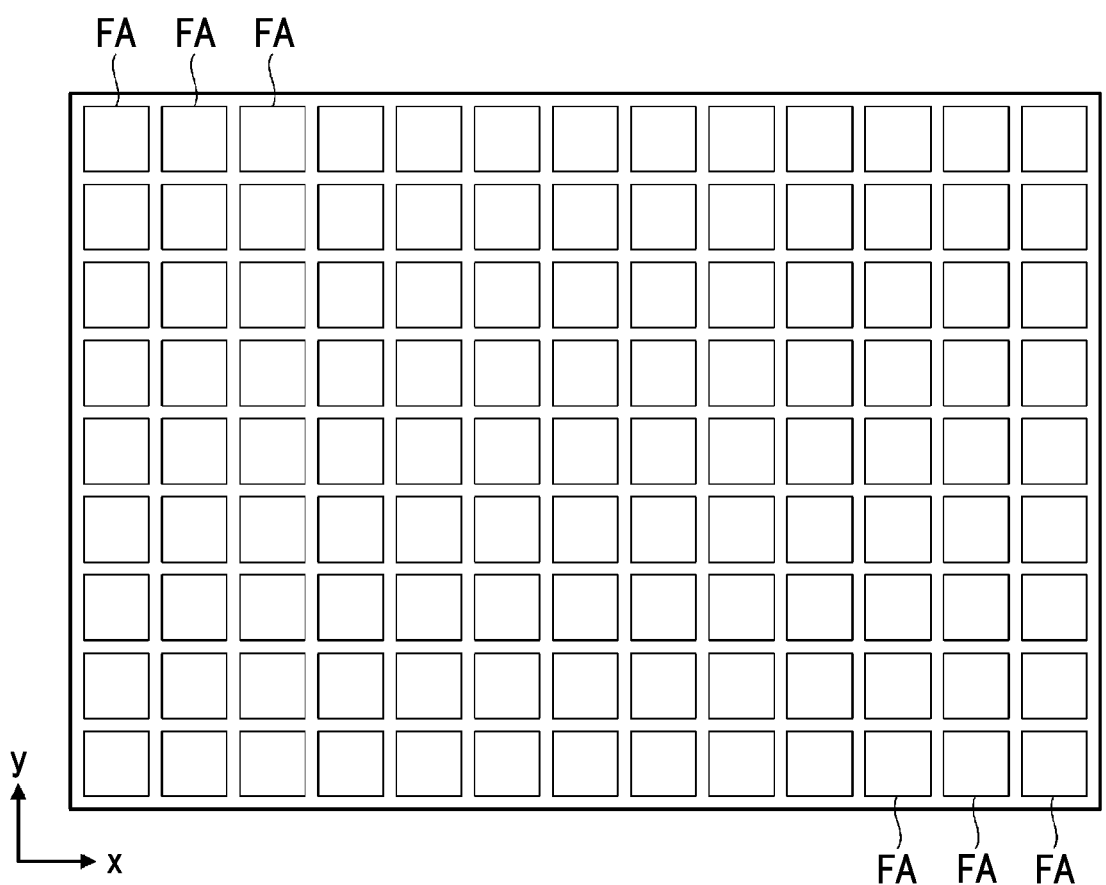
FIG. 7 is a diagram showing an example of setting of a focus area.

FIG. 7 is a diagram showing an example of setting of the focus area.

As shown in FIG. 7, in the imaging apparatus according to the present embodiment, a focus area FA is set by equally dividing the screen in a vertical direction and a horizontal direction. In the example shown in FIG. 7, the screen is divided into 9 equal parts in the vertical direction (y direction) and 13 equal parts in the horizontal direction (x direction), and 9×13 focus areas FA are set.

The focus evaluation value calculation unit 120C calculates the focus evaluation value of each focus area FA. The focus evaluation value is an index representing the focus state. In the present embodiment, phase difference information or the defocus amount obtained from the phase difference information is calculated as the focus evaluation value. The phase difference information is calculated based on information on the phase-difference detection pixel of each focus area FA. Since this point is known technology, the description of the details thereof will be omitted.

The in-focus region detection unit 120D detects the in-focus region based on information on the focus evaluation value of each focus area FA calculated by the focus evaluation value calculation unit 120C. That is, the region which is in focus is detected. In the imaging apparatus 1 according to the present embodiment, the focus area which is in focus is selected as the in-focus region. The focus area which is in focus is a focus area in which the phase difference or the defocus amount is equal to or smaller than an allowable value.

The tracking target setting unit 120E sets the subject which is the tracking target. The tracking target setting unit 120E sets the tracking target according to sensing of the termination of the focus operation. That is, in a case in which the termination of the focus operation is sensed by the focus operation sensing unit 120F, the tracking target is set. The tracking target setting unit 120E sets the subject present in the in-focus region as the tracking target in a case in which the termination of the focus operation is sensed. For example, in a case in which the termination of the focus operation is sensed in the state shown in FIG. 5, the person 300 is set as the tracking target.

The focus operation sensing unit 120F senses the start and the termination of the focus operation.

The start of the focus operation is sensed by a change in the position of the focus ring. That is, the start of the change in the position of the focus ring is sensed, and the start of the operation is sensed. As described above, the position of the focus ring is detected by the sensor provided in the focus operation unit 46. Accordingly, the focus operation sensing unit 120F senses the start of the focus operation based on the output of the sensor.

On the other hand, the termination of the focus operation is sensed based on a time related to the focus operation. Specifically, the termination of the focus operation is sensed based on a time of a non-operation state. The non-operation state means a state in which there is no focus operation. In the imaging apparatus 1 according to the present embodiment, the focus is operated by the focus ring. Accordingly, the state in which there is no focus operation means a state in which there is no operation of the focus ring. Here, the state in which there is no operation of the focus ring is a state in which the position of the focus ring is not changed.

The focus operation sensing unit 120F measures a duration time of the non-operation state (state in which the position of the focus ring is not changed) based on the output of the sensor that detects the position of the focus ring. Then, the focus operation sensing unit 120F senses the termination of the focus operation by sensing that a prescribed time has elapsed from the start of the non-operation state. The prescribed time is an example of a first time. The prescribed time is, for example, 500 ms. In this case, the focus operation sensing unit 120F senses the termination of the focus operation by sensing that 500 ms has elapsed from the start of the non-operation state.

The focus drive control unit 120G controls the driving of the focus lens 26 via the focus drive unit 36.

During the focus operation, the focus drive control unit 120G controls the driving of the focus lens 26 based on operation information of the focus ring (position information of the focus ring) from the focus operation unit 46. On the other hand, during the tracking AF, the driving of the focus lens 26 is controlled based on control information from the AF control unit 120I.

The tracking processing unit 120H performs the tracking processing. The tracking processing includes processing of detecting the tracking target and processing of setting the focus target area based on the detection result.

The processing of detecting the tracking target is performed based on the moving image data output from the imaging unit 110. Specifically, the tracking target is sequentially detected from the image of each frame constituting the moving image data. A known method, such as template matching, is adopted for the detection.

The focus target area is an area to be in focus. The focus target area is set from the focus area. The tracking processing unit 120H sets the focus area in which the tracking target is present as the focus target area. The tracking target is sequentially detected for each frame, and thus the focus target area is also sequentially set for each frame.

The tracking processing unit 120H continuously performs the tracking processing until the focus operation is started again or until the tracking target disappears. Accordingly, even in a case in which the tracking target is present, the tracking processing is forcibly terminated in a case in which the focus operation is performed again.

The AF control unit 120I performs auto focus control (AF control) on the focus target area set by the tracking processing unit 120H. That is, the control of focusing on the subject in the set focus target area is performed. Specifically, firstly, a control amount of the focus lens 26 (drive amount of the focus drive unit 36) required for focusing on the subject in the focus target area is calculated based on the information on the focus evaluation value in the focus target area. Then, information on the calculated control amount is given to the focus drive control unit 120G. The focus drive control unit 120G drives the focus drive unit 36 based on the given information on the control amount.

Similar to the tracking processing unit 120H, the AF control unit 120I continuously performs the AF control until the focus operation is started again or until the tracking target disappears.

[Processing Procedure of Imaging Control Performed in MF Mode (Imaging Control Method)]

Figure 8:
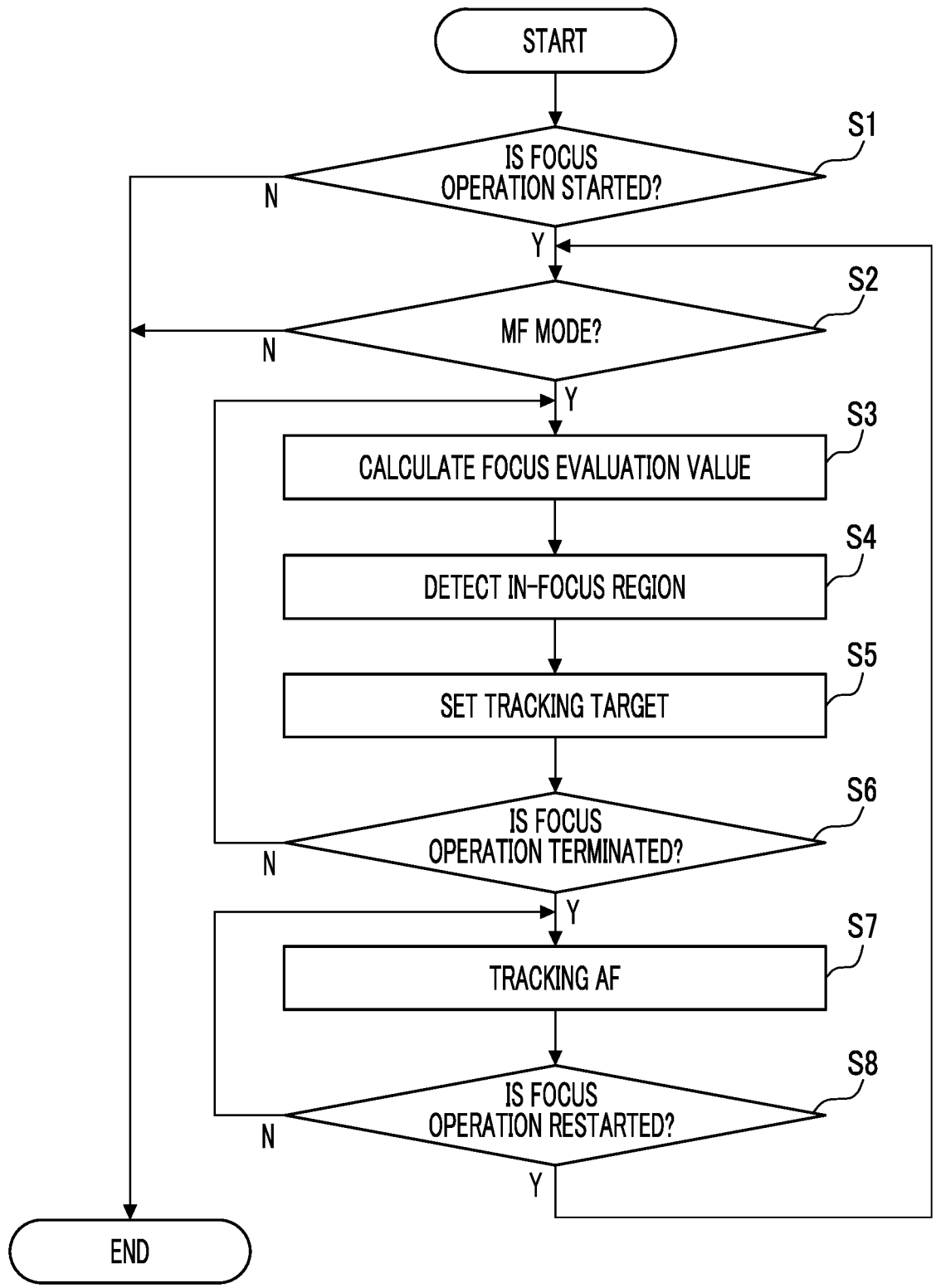
FIG. 8 is a flowchart showing a processing procedure of imaging control performed in the MF mode.

FIG. 8 is a flowchart showing a processing procedure of the imaging control performed in the MF mode.

Firstly, it is determined whether or not the focus operation is started (step S1). Whether or not there is the focus operation is determined based on the output from the focus operation unit 46. That is, it is determined based on the output from the sensor that detects the position of the focus ring. In a case in which there is the output from the sensor that detects the position of the focus ring, it is determined that the focus operation is started.

In a case in which it is determined that the focus operation is started, it is determined whether or not the focus mode is set to the MF mode (step S2). The focus mode is determined based on a setting state of the focus mode selector switch.

In a case in which it is determined that the MF mode is set, the focus evaluation value of each focus area is calculated (step S3). The in-focus region is detected based on the calculation result (step S4). That is, the focus area in the in-focus state is detected. The detected in-focus region is shown on the image of the live view. In the present embodiment, the frame of the focus area determined as the in-focus region is displayed in red. Accordingly, the user (cameraman) can check the in-focus region by visually recognizing the live view.

In the case in which the in-focus region is detected, the tracking target is set (step S5). The tracking target is set to the subject present in the in-focus region. In the imaging apparatus according to the present embodiment, the in-focus region is set as the region which is the tracking target. That is, the in-focus region is set as the region in which the tracking target is present.

After the tracking target is set, it is determined whether or not the focus operation is terminated (step S6). For the focus operation, it is determined that the operation is terminated in a case in which the non-operation state is continued for a prescribed time. That is, the termination of the operation is sensed.

In a case in which the termination of the focus operation is sensed, the tracking AF is started (step S7). That is, the tracking processing and the AF control are continuously performed on the subject set as the tracking target. More specifically, the focus target area is set according to the movement of the subject set as the tracking target, and the AF control (so-called continuous AF control) is continuously performed so that the subject in the set focus target area is in focus.

In addition, in a case in which the termination of the focus operation is sensed, the display of the in-focus region is switched. That is, the color of the frame of the focus area indicating the in-focus region is switched. In the present embodiment, the color of the frame of the focus area indicating the in-focus region is switched from red to green. As a result, the user can recognize the transitioning to the mode in which the tracking AF is performed. In addition, the subject set as the tracking target can be recognized simultaneously.

The tracking AF is continuously performed until the focus operation is started again or until the tracking target disappears. Accordingly, the focus operation is always monitored during the tracking AF. That is, it is determined whether or not the focus operation is performed again (step S8). In a case in which it is determined that the focus operation is restarted, the tracking AF is forcibly terminated. That is, the tracking processing and the AF control based on the tracking processing are terminated. After the tracking AF is terminated, the operation in the normal MF mode is restored, and the processing after step S2 is repeated.

Figure 9:
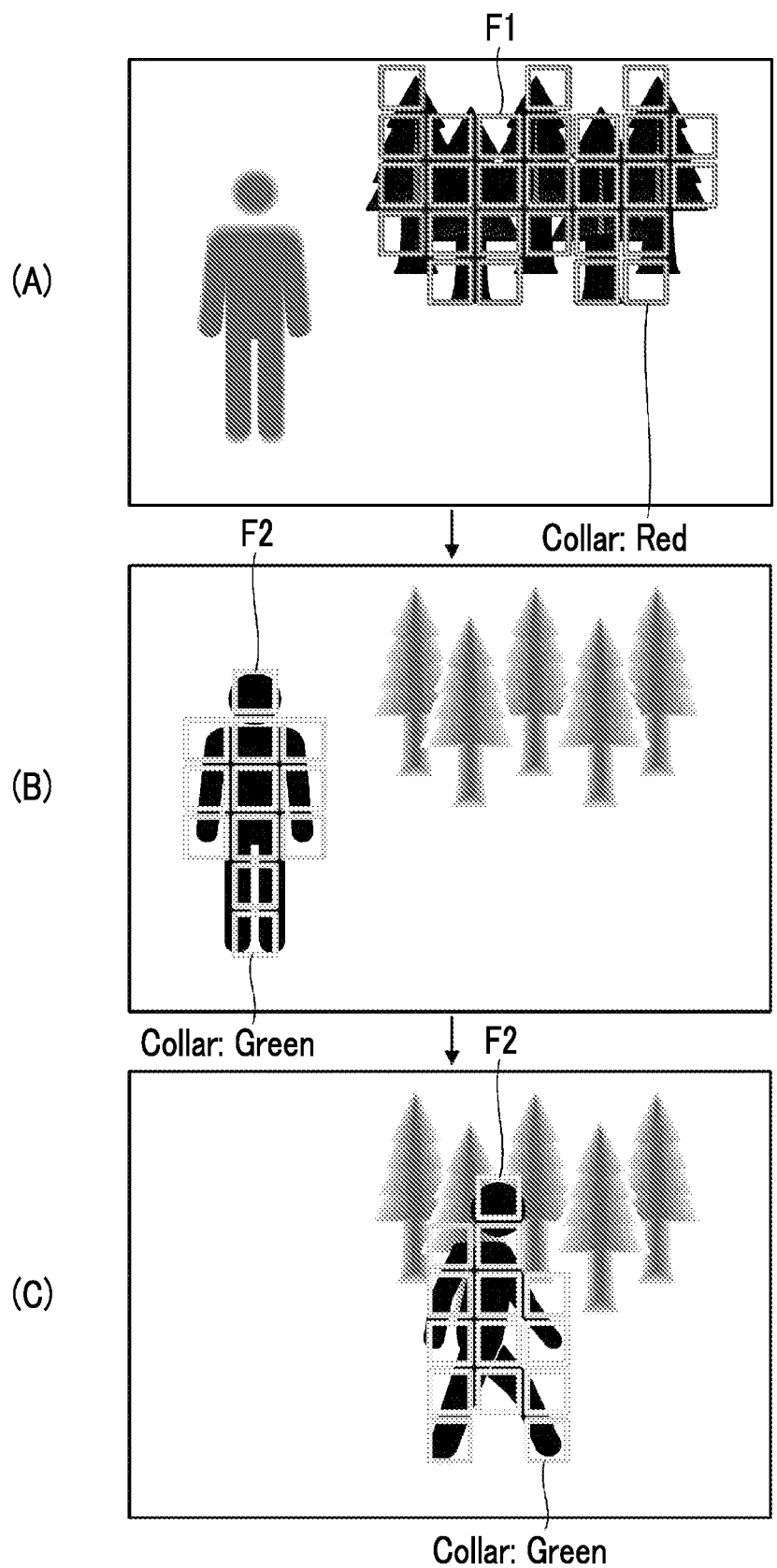
FIG. 9 is a diagram showing an example of display of a live view in the MF mode.

FIG. 9 is a diagram showing an example of the display of the live view in the MF mode. A portion (A) in FIG. 9 shows an example of the display during the focus operation. A portion (B) in FIG. 9 shows an example of the display immediately after the termination of the focus operation is sensed. A portion (C) in FIG. 9 shows an example of the display during the tracking AF.

During the focus operation, the frame F1 of the focus area in the in-focus state is displayed in red as the information indicating the in-focus region. The portion (A) in FIG. 9 shows that the tree in the background is in focus.

In a case in which the termination of the focus operation is sensed, the color of the frame F2 of the focus area indicating the in-focus region is switched from red to green. The portion (B) in FIG. 9 shows that the focus operation is terminated by focusing on the person in the foreground. By switching the color of the frame F2, it is possible to check the switching to the tracking AF.

During the tracking AF, as shown in the portion (C) in FIG. 9, the frame F2 of the focus area in which the tracking target is present is displayed in green. As a result, the tracking target can be checked on the screen.

In a case in which the focus operation is restarted during the tracking AF, the tracking AF is terminated. In a case in which the tracking AF is terminated, the operation in the normal MF mode is restored. Accordingly, the display of the display unit 112 is restored to the state of the portion (A) in FIG. 9. That is, the frame F1 of the focus area in the in-focus state is displayed in red. By switching the color of the displayed frame F1 from green to red, it can be checked that the normal MF mode is restored.

It should be noted that a configuration may be adopted in which, in a case in which the tracking AF is terminated or the MF mode is restored, a notification to that effect is separately given. For example, the display unit 112 may display information notifying the termination of the tracking AF.

As described above, with the imaging apparatus 1 according to the present embodiment, the imaging apparatus 1 maintains the focusing by the MF. Therefore, a burden of the focus operation by the user can be greatly reduced.

In addition, the start of the tracking AF is determined based on the time related to the focus operation, particularly, the duration time of the non-operation state. Therefore, the tracking AF can be started according to the intention of the user. Also, since a special mechanism for switching is not required, the configuration can be simplified.

Further, in a case in which the switching to the tracking AF is performed, the display content of the display unit 112 is switched, so that an operation state can be clearly grasped. As a result, good operability can be realized.

Modification Example

Modification Example of Sensing of Termination of Focus Operation

The termination of the focus operation is sensed based on the time related to the focus operation. It is preferable that the time related to the focus operation is the time of the non-operation state. That is, it is preferable to sense the termination of the focus operation based on the duration time of the non-operation state.

In addition, 0 can be included in the duration time of the non-operation state for sensing the termination of the focus operation (hereinafter, referred to as a sensing time). In a case in which the sensing time (first time) is 0, the tracking AF is started immediately after the focus ring is stopped.

In addition, a configuration may be adopted in which the user can optionally set the sensing time. This setting is performed by using, for example, the display unit 112 and the body operation unit 118. As a result, the setting can be set according to the preference of the user and the like.

Further, the sensing time may be automatically set from the past operation tendency of the user. For example, the duration times of the non-operation states may be recorded for a plurality of times, and a preferable sensing time may be set by calculation using a statistical method.

Figure 10:
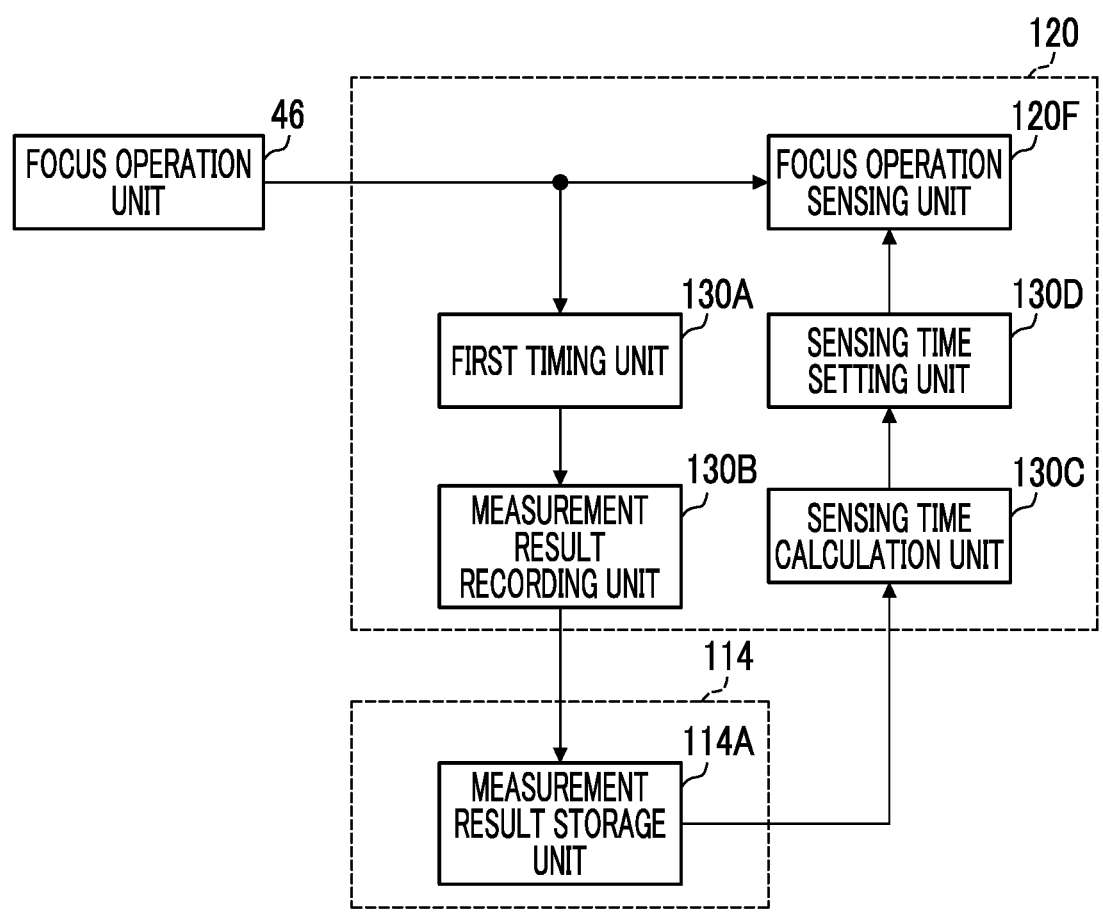
FIG. 10 is a block diagram showing an example of functions realized by the CPU in a case in which a sensing time is set by using a statistical method.

FIG. 10 is a block diagram showing an example of functions realized by the CPU in a case in which the sensing time is set by using the statistical method.

As shown in FIG. 10, the CPU 120 further functions as a first timing unit 130A, a measurement result recording control unit 130B, a sensing time calculation unit 130C, a sensing time setting unit 130D, and the like.

The first timing unit 130A measures the duration time of the non-operation state.

The measurement result recording control unit 130B records information on the measurement result of the duration time of the non-operation state by the first timing unit 130A. The measurement result is stored in the measurement result storage unit 114A. The measurement result storage unit 114A is set in one storage region of the storage unit 114. The measurement result storage unit 114A stores the measurement results for a prescribed number of times. For example, in the present example, the measurement results for three times are stored. The measurement result recording control unit 130B rewrites the measurement results in the oldest order and records the measurement results. Accordingly, the measurement result storage unit 114A stores the measurement results for the most recent prescribed number of times (three times in the present example).

The sensing time calculation unit 130C calculates the sensing time by the statistical method based on the information on the duration times of the non-operation states for a plurality of times stored in the measurement result storage unit 114A. In the present example, the sensing time is calculated by calculating an average value.

The sensing time setting unit 130D sets the time calculated by the sensing time calculation unit 130C as the sensing time.

The focus operation sensing unit 120F senses the termination of the focus operation based on the sensing time set by the sensing time setting unit 130D.

In this way, the sensing time can be automatically set from the past operation tendency of the user. As a result, it is possible to switch to the tracking AF according to the operation tendency of the user.

It should be noted that an upper limit may be set for the sensing time that can be set. As a result, it is possible to prevent the sensing time from being unintentionally set to be long. In this case, it is more preferable that an upper limit value can be optionally set.

In addition, in the example described above, the configuration is adopted in which the average value is calculated as the statistical method, but the method for calculating the sensing time is not limited to this. In addition, a configuration can also be adopted in which a median value, a mode value, and the like are calculated as the sensing time.

Modification Example of Setting of Tracking Target

The tracking target can also be set to be limited to a specific subject by using image recognition. For example, in the imaging in which the person is a target, the tracking target can be set to be limited to the person present in the in-focus region. In addition, it is also possible to set the tracking target to be limited to a face, eyes, and the like, instead of the entire person.

Figure 11:
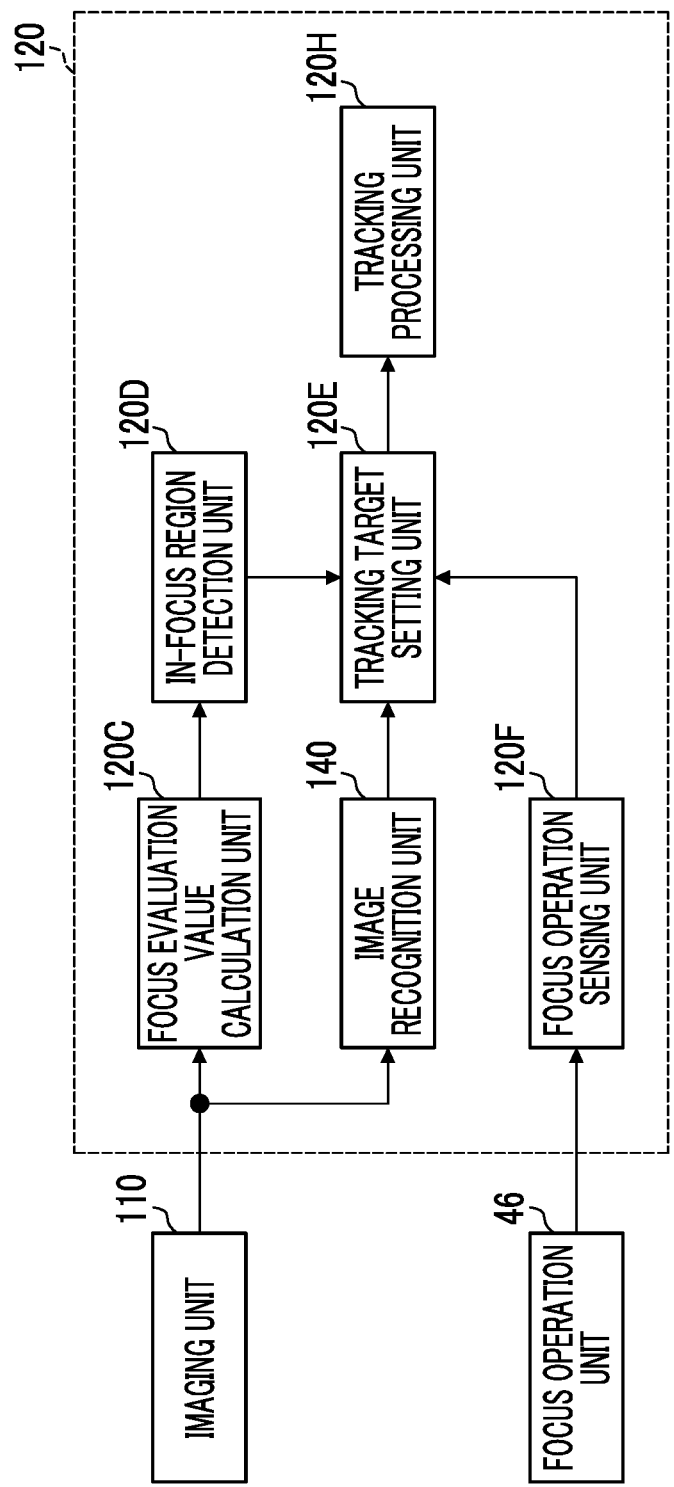
FIG. 11 is a block diagram showing an example of functions realized by the CPU in a case in which a tracking target is set by using image recognition.

FIG. 11 is a block diagram showing an example of functions realized by the CPU in a case in which the tracking target is set by using the image recognition. Here, the description will be made with a case in which the tracking target is set to be limited to the face, as an example As shown in FIG. 11, the CPU 120 further functions as an image recognition unit 140.

The image recognition unit 140 processes the moving image data captured by the imaging unit 110 to detect the face in the image. Known technology can be adopted as technology for detecting the face from an image. For example, it is possible to adopt technology of detecting a region of the face of the person by using an image recognition model generated by machine learning, deep learning, or the like.

The tracking target setting unit 120E sets the tracking target based on the information on the in-focus region detected by the in-focus region detection unit 120D and the information on the region of the face of the person detected by the image recognition unit 140. Specifically, the tracking target is set in the region of the face of the person of the subject present in the in-focus region. Accordingly, in this case, even in a case in which the entire body of the person is in focus, the tracking target is limited to the region of the face, and the tracking target is set.

In this way, it is possible to set the tracking target to be limited to the specific subject according to an imaging target or the like. As a result, the burden of the focus operation by the user can be further reduced.

It should be noted that, in the example described above, the example has been described in which the person is recognized and the tracking target is set, but the tracking target may further be set by recognizing the individual. That is, a configuration can also be adopted in which individual authentication is performed by using the image recognition and set the tracking target to be limited to the specific person.

Modification Example of Display of Information Indicating In-Focus Region

In the embodiment described above, the configuration is adopted in which the frame of the focus area in the in-focus state is displayed as the information indicating the in-focus region, but the display form of the information indicating the in-focus region (form added to the image of the live view) is not limited to this. Any form may be used as long as the in-focus region can be visually recognized on the image of the live view.

Figure 12:
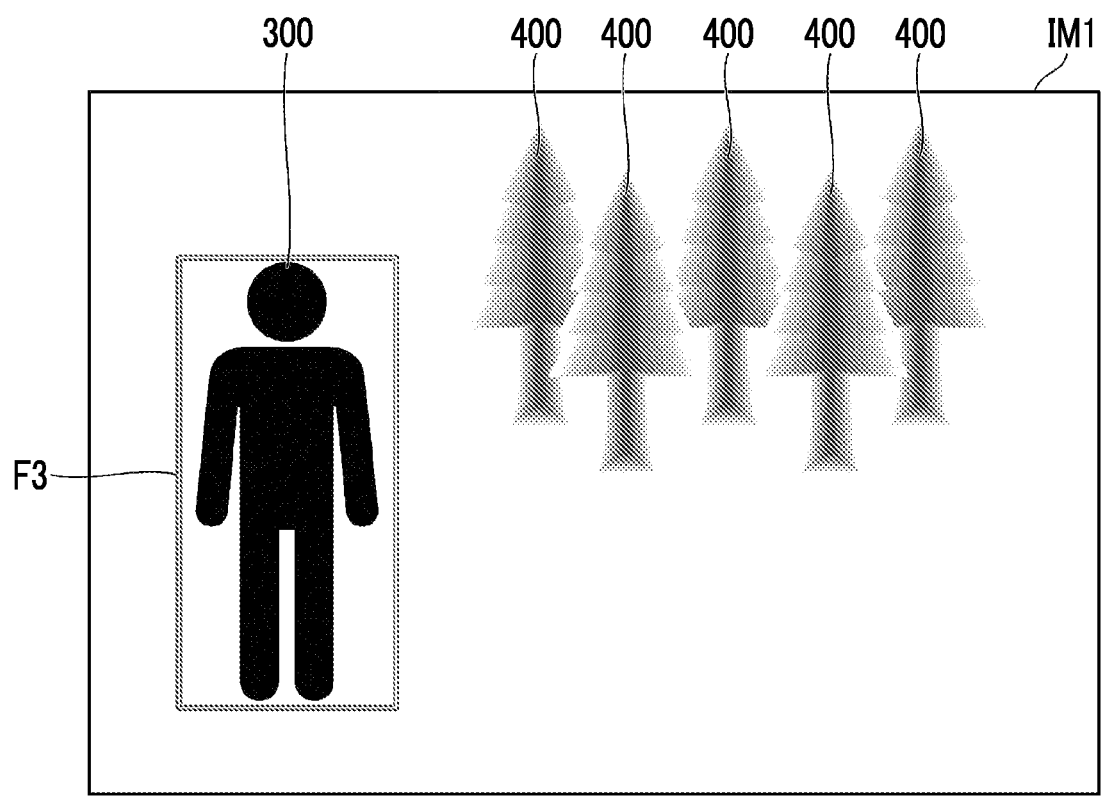
FIG. 12 is a diagram showing another example of a display form of information indicating an in-focus region.

FIG. 12 is a diagram showing another example of the display form of the information indicating the in-focus region.

In the example shown in FIG. 12, the in-focus region is displayed by one rectangular frame F3. The frame F3 is set, for example, as a minimum frame surrounding the focus area in the in-focus state.

The same applies to the information indicating the tracking target. Any form may be used as long as the tracking target can be visually recognized on the image of the live view.

In addition, in the embodiment described above, the switching of the operation mode is recognized by changing the color of the frame, but the method of allowing the user to recognize the switching of the operation mode is not limited to this. It is possible to change the content of the information indicating the various in-focus regions to allow the user to recognize the switching of the operation mode. For example, a configuration may be adopted in which a shape of the frame indicating the in-focus region, a line type, and the like are changed to recognize the switching of the operation mode.

Setting of On and Off of Tracking AF Function

In the embodiment described above, the tracking AF is automatically started in a case in which the termination of the focus operation is sensed in the MF mode, but a configuration may be adopted in which the function can be optionally turned on and off by the user setting. That is, a configuration is adopted in which the tracking AF is automatically started in a case in which the termination of the focus operation is sensed in the MF mode only in a case in which the function is turned on. The setting is performed, for example, by providing a dedicated selector switch or the like in the body operation unit 118. Alternatively, the display unit 112 and the body operation unit 118 are used. In the MF mode, the operation mode in which the tracking AF is performed, that is, the operation mode in which the tracking AF function is set to on is another example of the first focus mode.

Second Embodiment

In a case in which the tracking AF is started, in a case in which the focus is moved in a direction opposite to an immediately preceding movement direction of the focus, there is a risk that a viewer feels uncomfortable. For example, in a case in which the focus is moved from a close side to an infinity side to perform focusing on the target subject, in a case in which the focus is immediately restored to the close side, the viewer feels uncomfortable.

Therefore, in the imaging apparatus according to the present embodiment, after the tracking AF is started, the movement direction of the focus is limited to a certain direction for a certain time. That is, the movement direction of the focus by the AF is limited to the same direction as the movement direction of the focus in a case in which the focus operation is terminated. Accordingly, for example, in a case in which the focus is moved from the close side to the infinity side to perform focusing on the target subject, the movement direction of the focus by the AF is limited to an infinity direction for a prescribed time. As a result, stable focus movement can be realized in the imaging of the moving image.

[Apparatus Configuration]

Here, only the description of the configuration required for the function of limiting the movement direction of the focus will be made.

Figure 13:
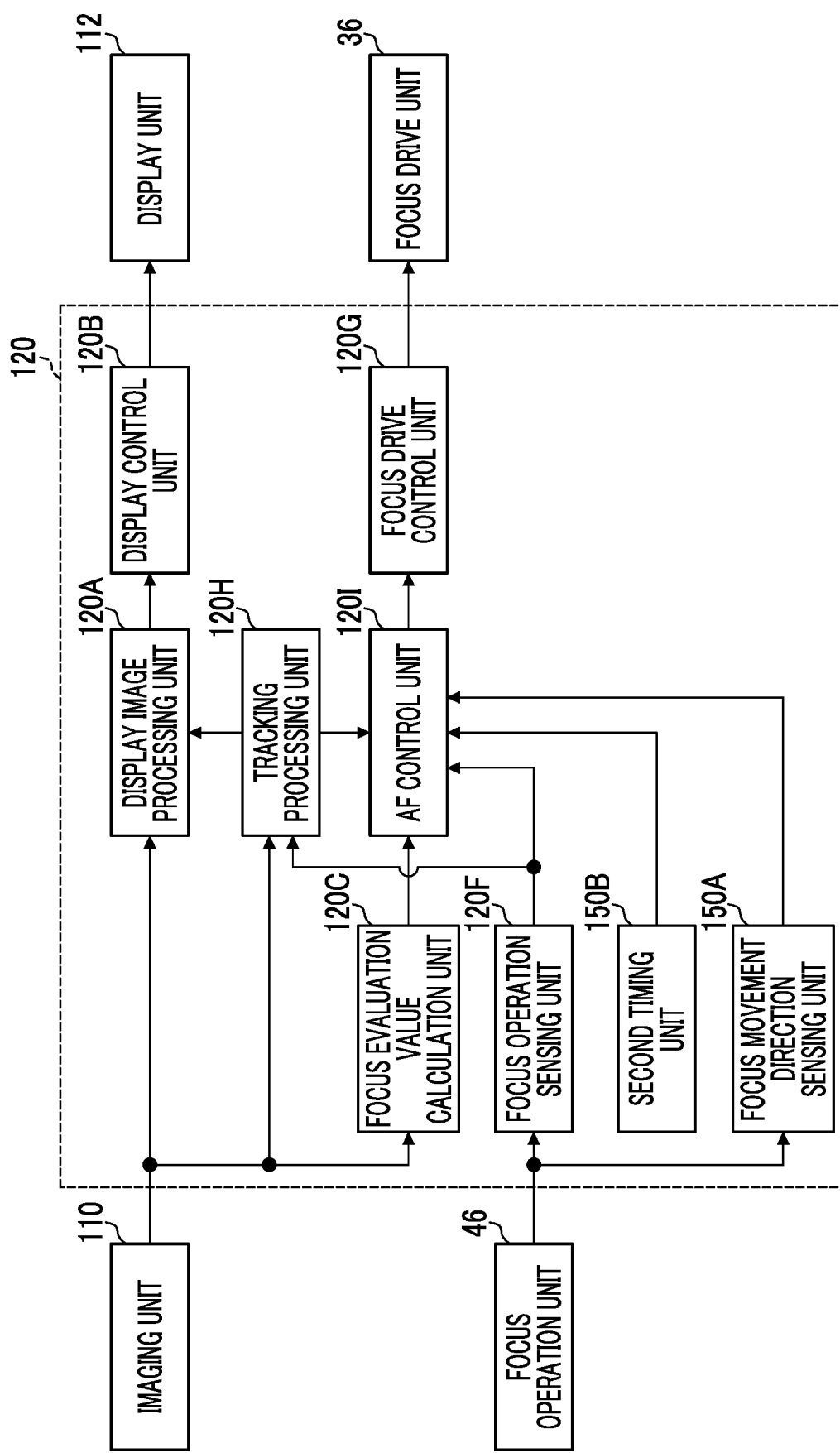
FIG. 13 is a block diagram of main functions realized by the CPU in a case in which the tracking AF is performed by limiting a movement direction of a focus.

FIG. 13 is a block diagram of main functions realized by the CPU in a case in which the tracking AF is performed by limiting the movement direction of the focus.

As shown in FIG. 13, in the imaging apparatus according to the present embodiment, the CPU 120 further functions as a focus movement direction sensing unit 150A and a second timing unit 150B.

The focus movement direction sensing unit 150A senses the movement direction of the focus based on the operation information of the focus ring output from the focus operation unit 46. In the MF, the focus is moved in an operation direction of the focus ring. Accordingly, the movement direction of the focus can be sensed by sensing the operation direction of the focus ring.

The second timing unit 150B measures an elapsed time from the start of the tracking AF. The tracking AF is started according to the sensing of the termination of the focus operation. Accordingly, the second timing unit 150B starts the measurement of the elapsed time according to the sensing of the termination of the focus operation.

The AF control unit 120I performs the AF control by limiting the movement direction of the focus to the immediately preceding movement direction of the focus until a certain time elapses after the start of the AF control. The immediately preceding movement direction of the focus is a movement direction of the focus immediately before the termination of the focus operation is sensed. The immediately preceding movement direction of the focus is detected as the movement direction of the focus finally sensed by the focus movement direction sensing unit 150A in a case in which the termination of the focus operation is sensed. The elapsed time from the start of the tracking AF is measured by the second timing unit 150B. Accordingly, the AF control unit 120I performs the AF control by limiting the movement direction of the focus to the immediately preceding movement direction until the time measured by the second timing unit 150B elapses a prescribed time. The prescribed time is an example of a second time. For example, in the imaging apparatus according to the present embodiment, the prescribed time is set to 3 s. In this case, the movement direction of the focus is limited to the immediately preceding movement direction for 3 s after the tracking target is set. It should be noted that, since the tracking AF is started according to the sensing of the termination of the focus operation, the elapsed time from the start of the tracking AF is synonymous with the elapsed time from the sensing of the termination of the focus operation.

[Processing Procedure of Imaging Control]

Figure 14:
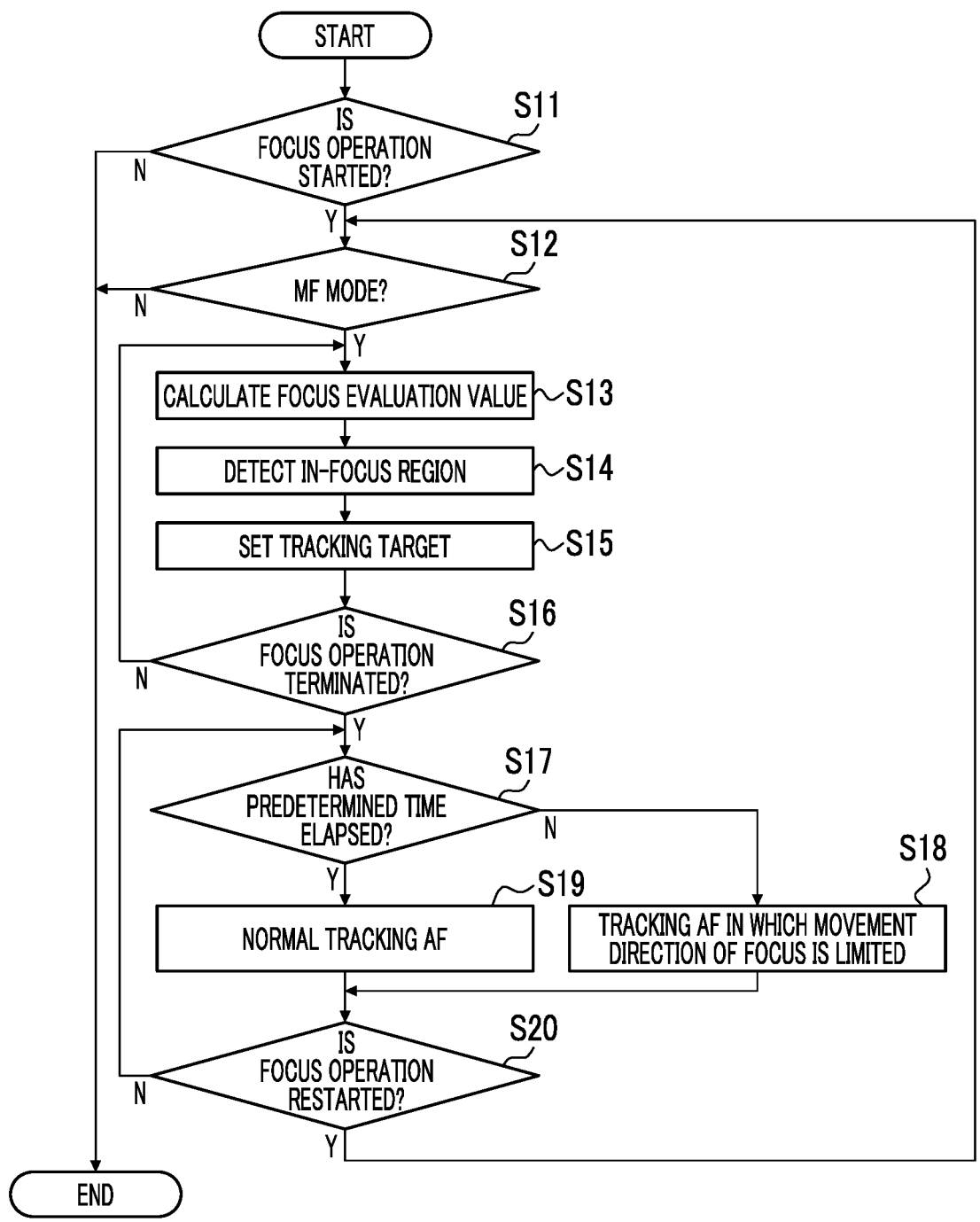
FIG. 14 is a flowchart showing a processing procedure of the imaging control.

FIG. 14 is a flowchart showing a processing procedure of the imaging control.

The processing (steps S11 to S16) until the tracking AF is started is the same as the processing of the imaging apparatus according to the first embodiment. Firstly, it is determined whether or not the focus operation is started (step S11). In a case in which the focus operation is started, it is determined whether or not the focus mode is set to the MF mode (step S12). In a case in which the MF mode is set, the focus evaluation value of each focus area is calculated (step S13), and the in-focus region is detected based on the calculation result (step S14). Then, the tracking target is set based on the information on the detected in-focus region (step S15). That is, the subject present in the in-focus region is set as the tracking target. Thereafter, it is determined whether or not the focus operation is terminated (step S16).

In a case in which it is determined that the focus operation is terminated, it is determined whether or not the prescribed time (second time) has elapsed (step S17). That is, it is determined whether or not the prescribed time has elapsed from the setting of the tracking target.

In a case in which the prescribed time has not elapsed (in a case in which step S17 is No), the tracking AF in which the movement direction of the focus is limited is performed (step S18). The AF control unit 120I performs the AF control by limiting the movement direction of the focus to the movement direction of the focus immediately before the termination of the focus operation is sensed. For example, in a case in which the focus is moved from the close side to the infinity side and the focus operation is terminated, the AF control is performed by limiting the movement direction of the focus to the infinity direction. Accordingly, for example, in a case in which the tracking target moves in a close direction during this period, the AF control is not performed.

On the other hand, in a case in which the prescribed time has elapsed (in a case in which step S17 is Yes), the normal tracking AF is performed (step S19). That is, the AF control is performed without limiting the movement direction of the focus.

The tracking AF is continuously performed until the focus operation is started again or until the tracking target disappears. Accordingly, the focus operation is always monitored during the tracking AF. That is, it is determined whether or not the focus operation is performed again (step S20). In a case in which it is determined that the focus operation is restarted, the tracking AF is forcibly terminated. After the tracking AF is terminated, the operation in the normal MF mode is restored, and the processing after step S12 is repeated.

As described above, with the imaging apparatus according to the present embodiment, in a case in which the tracking AF is started, the movement direction of the focus is limited to a certain direction for a certain time. As a result, stable focus movement can be realized in the imaging of the moving image.

It should be noted that this function may be able to be optionally turned on and off by the selection of the user. In addition, a configuration may be adopted in which the user can optionally change the setting of the prescribed time.

Third Embodiment

Normally, in the imaging of the moving image, the imaging is performed by deciding an output format, such as a television screen or a movie screen. Accordingly, a case in which a posture (orientation) of the imaging apparatus is changed (for example, a case in which vertical shooting is changed to the horizontal shooting) is considered to be a case in which the production, scene change, or the like is performed. In a case in which the tracking AF is continuously performed even in a case in which the posture of the imaging apparatus is changed, there is a risk that the tracking of an unintended subject may be continued.

Therefore, in the imaging apparatus according to the present embodiment, in a case in which the posture of the imaging apparatus is changed during the tracking AF, the tracking AF is forcibly terminated, and the switching to the operation in the normal MF mode is performed. As a result, stable focus movement can be realized in the imaging of the moving image.

[Apparatus Configuration]

Here, only the description of the configuration required for the function of forcibly terminating the tracking AF in a case in which the posture of the imaging apparatus changes will be made.

Figure 15:
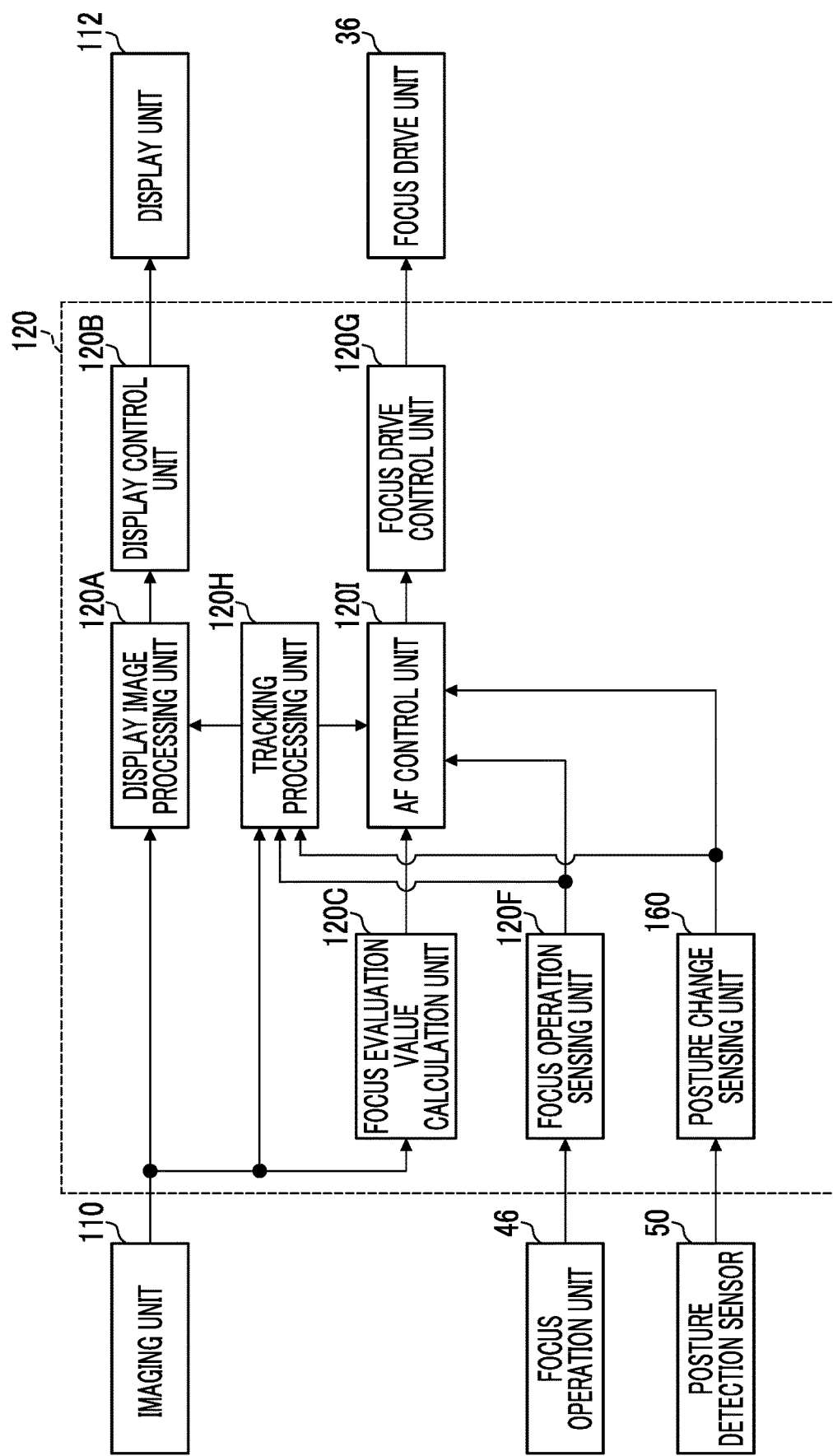
FIG. 15 is a block diagram of main functions realized by the CPU in a case in which tracking AF is forcibly terminated in a case in which a posture of the imaging apparatus is changed.

FIG. 15 is a block diagram of main functions realized by the CPU in a case in which tracking AF is forcibly terminated in a case in which a posture of the imaging apparatus is changed.

As shown in FIG. 15, in the imaging apparatus according to the present embodiment, the CPU 120 further functions as a posture change sensing unit 160. In addition, the imaging apparatus according to the present embodiment comprises a posture detection sensor 50 that detects a posture of the apparatus body. The posture detection sensor 50 is configured by known sensors for posture detection (for example, an acceleration sensor, a gyro sensor, or a sensor in which the acceleration sensor and the gyro sensor are combined), and is built in the apparatus body.

The posture change sensing unit 160 senses the change in the posture equal to or larger than a threshold value with respect to a reference posture based on information on the posture of the apparatus body detected by the posture detection sensor 50. In particular, in the present embodiment, the change in the posture about the optical axis is sensed. The reference posture is, for example, a posture in which a long side of the imaging element 110A is horizontal or vertical. The posture in which the long side of the imaging element 110A is horizontal is a so-called horizontal shooting posture. On the other hand, the posture in which the long side of the imaging element 110A is vertical is a so-called vertical shooting posture. The reference posture is set in advance by the user. Alternatively, the posture in a case of the imaging of the moving image is set to the reference posture. In this case, the posture of the apparatus body is detected in a case of the imaging of the moving image, and set as the reference posture.

The tracking processing unit 120H terminates the tracking processing in a case in which the posture change sensing unit 160 senses the change in the posture equal to or larger than the threshold value during the tracking processing.

In addition, the AF control unit 120I terminates the AF control in a case in which the posture change sensing unit 160 senses the change in the posture equal to or larger than the threshold value during the AF control.

[Processing Procedure of Imaging Control]

Figure 16:
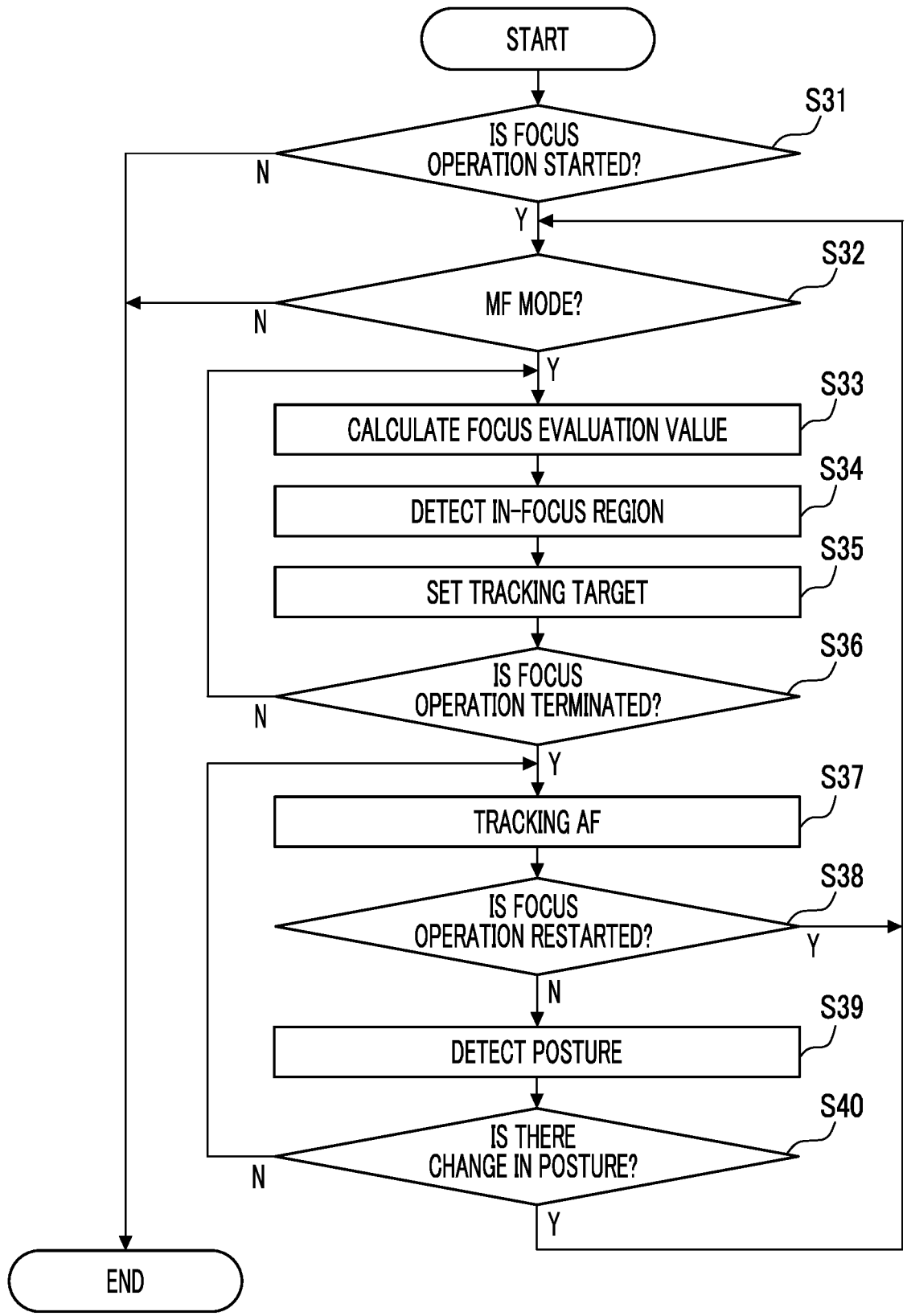
FIG. 16 is a flowchart showing a processing procedure of the imaging control.

FIG. 16 is a flowchart showing a processing procedure of the imaging control.

The processing (steps S31 to S37) until the tracking AF is started is the same as the processing of the imaging apparatus according to the first embodiment. Firstly, it is determined whether or not the focus operation is started (step S31). In a case in which the focus operation is started, it is determined whether or not the focus mode is set to the MF mode (step S32). In a case in which the MF mode is set, the focus evaluation value of each focus area is calculated (step S33), and the in-focus region is detected based on the calculation result (step S34). Then, the tracking target is set based on the information on the detected in-focus region (step S35). That is, the subject present in the in-focus region is set as the tracking target. Thereafter, it is determined whether or not the focus operation is terminated (step S36). In a case in which it is determined that the focus operation is terminated, the tracking AF is started (step S37). That is, the tracking processing and the AF control are performed on the subject set as the tracking target.

In a case in which the tracking AF is started, firstly, it is determined whether or not the focus operation is performed again (step S38). In a case in which it is determined that the focus operation is restarted, the tracking AF is forcibly terminated. Thereafter, the operation in the normal MF mode is restored, and the processing after step S32 is repeated.

On the other hand, in step S38, in a case in which it is determined that the focus operation is not restarted, the posture of the apparatus body is detected (step S39). Then, it is determined whether or not there is the change in the posture based on the detection result (step S40). That is, it is determined whether or not the posture is changed to be equal to or larger than the threshold value with respect to the reference posture.

In a case in which it is determined that there is the change in the posture, the tracking AF is forcibly terminated. Thereafter, the operation in the normal MF mode is restored, and the processing after step S32 is repeated.

On the other hand, in a case in which it is determined that there is no change in the posture, the tracking AF is continuously performed. That is, the processing after step S37 is repeated.

As described above, with the imaging apparatus according to the present embodiment, in a case in which the posture of the imaging apparatus is changed during the tracking AF, the tracking AF is automatically terminated, and the switching to the operation in the normal MF mode is performed. As a result, stable focus movement can be realized in the imaging of the moving image.

It should be noted that this function may be able to be optionally turned on and off by the selection of the user. In addition, a configuration may be adopted in which the threshold value used to sense the change in the posture can be optionally set and changed by the user. In addition, a configuration may be adopted in which the type of the posture to be detected can be optionally set by the user.

In addition, in the embodiment described above, the configuration is adopted in which the change in the posture of the apparatus body is detected by using a dedicated sensor, but a configuration may be adopted in which the change in the posture of the apparatus body is detected by analyzing the captured moving image data. In addition, a configuration may be adopted in which the change in the posture of the apparatus body is detected by using a sensor that detects camera shake.

Fourth Embodiment

In the imaging apparatus according to the first embodiment, in a case in which a plurality of subjects are present in the in-focus region, all the subjects are set as the tracking targets. However, in a case in which the plurality of subjects are set as the tracking targets, subsequent tracking AF cannot be performed in a case in which the respective subjects move differently. Therefore, in the imaging apparatus according to the present embodiment, in a case in which the plurality of subjects are set as the tracking targets, the tracking AF is performed with priority given to the specific subject. Specifically, the tracking AF is performed with priority given to the subject having no movement or the subject having the smallest movement amount.

[Apparatus Configuration]

Here, only the description of the function required for performing the tracking AF will be made.

Figure 17:
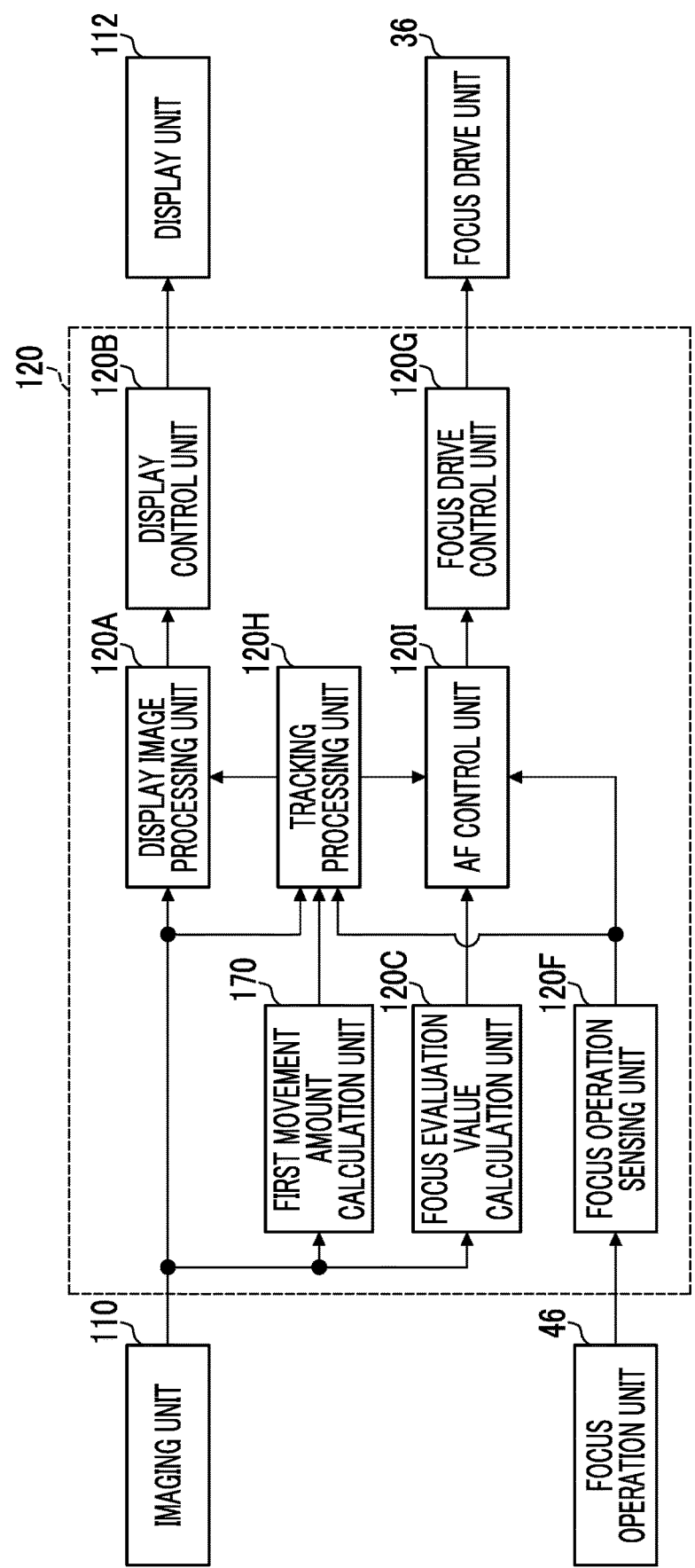
FIG. 17 is a block diagram of main functions realized by the CPU in a case in which the tracking AF is performed.

FIG. 17 is a block diagram of main functions realized by the CPU in a case in which the tracking AF is performed.

As shown in FIG. 17, in the imaging apparatus according to the present embodiment, the CPU 120 further functions as a first movement amount calculation unit 170.

The first movement amount calculation unit 170 processes the moving image data obtained by the imaging to calculate the movement amount of the subject in the image represented by the moving image data. In the present embodiment, a movement vector is calculated as the movement amount. That is, the first movement amount calculation unit 170 calculates the movement vector in the image to calculate the movement vector of the subject in the image. Known technology is adopted for the calculation of the movement vector. For example, a method of dividing the screen into blocks of M×N (M and N are integers of 2 or larger) and calculating the movement vector for each block is adopted.

In a case in which a plurality of subjects are set as the tracking targets, the tracking processing unit 120H sets the tracking target based on the information on the movement amount of each subject calculated by the first movement amount calculation unit 170, and performs the tracking processing. Specifically, the tracking target is set with priority given to the subject having no movement or the subject having the smallest movement amount, and the tracking processing is performed. Therefore, in a case in which the plurality of subjects are set as the tracking targets, the tracking processing unit 120H performs processing of excluding the subject of which the movement amount is equal to or larger than the threshold value from the tracking targets. As a result, the subject having no movement or the subject having the smallest movement amount is finally set as the tracking target, and the tracking processing is performed.

[Processing Procedure of Imaging Control]

Figure 18:
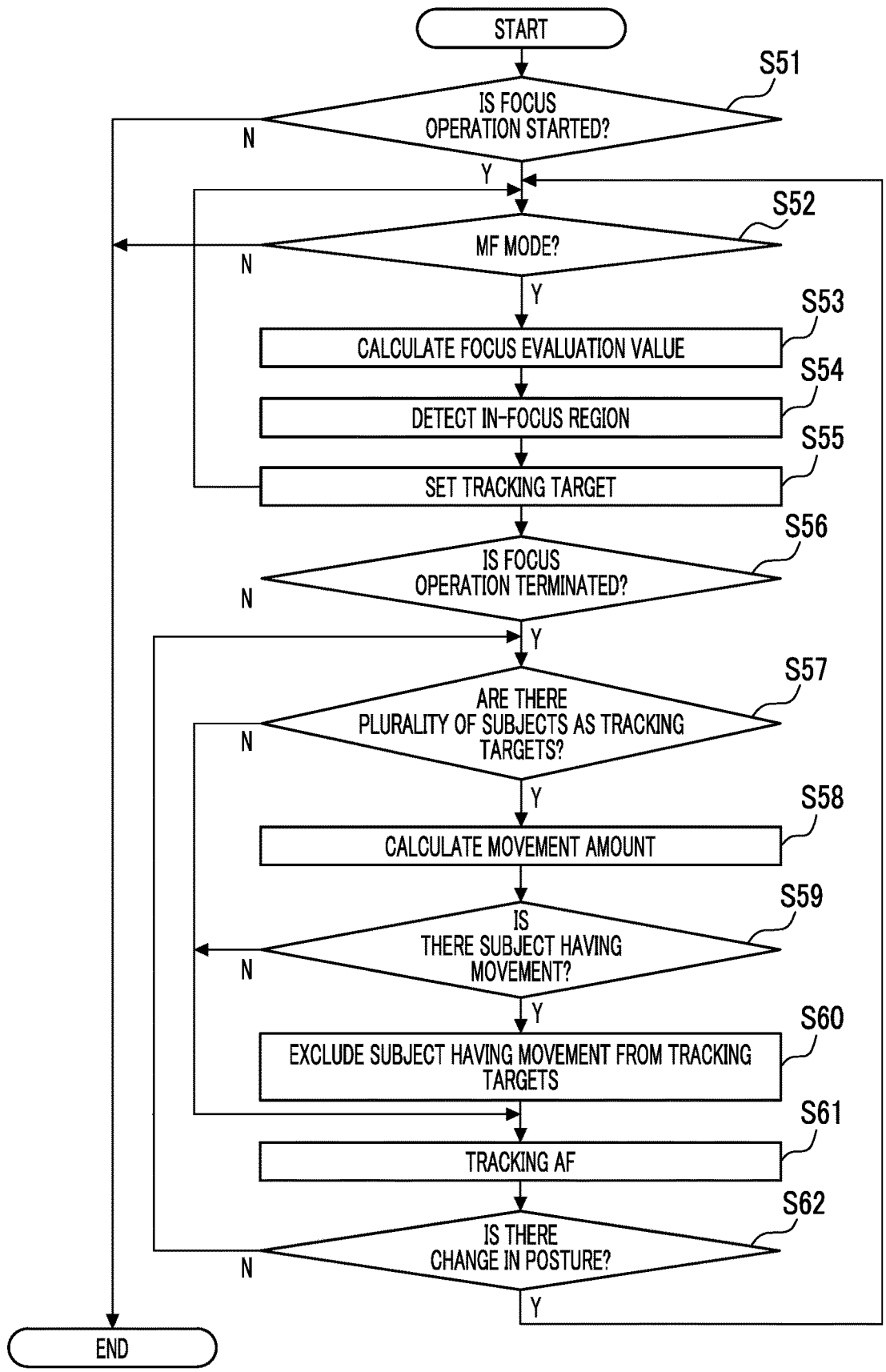
FIG. 18 is a flowchart showing a processing procedure of the imaging control.

FIG. 18 is a flowchart showing a processing procedure of the imaging control.

The processing (steps S51 to S56) until the tracking AF is started is the same as the processing of the imaging apparatus according to the first embodiment. Firstly, it is determined whether or not the focus operation is started (step S51). In a case in which the focus operation is started, it is determined whether or not the focus mode is set to the MF mode (step S52). In a case in which the MF mode is set, the focus evaluation value of each focus area is calculated (step S53), and the in-focus region is detected based on the calculation result (step S54). Then, the tracking target is set based on the information on the detected in-focus region (step S55). That is, the subject present in the in-focus region is set as the tracking target. Thereafter, it is determined whether or not the focus operation is terminated (step S56).

In a case in which it is determined that the focus operation is terminated, it is determined whether or not the plurality of subjects are set as the tracking targets (step S57). In a case in which it is determined that the plurality of subjects are not set as the tracking target, the tracking AF is performed on the subject set as the tracking target (step S61).

On the other hand, in a case in which it is determined that the plurality of subjects are set as the tracking targets, the movement amount of each subject in the image is calculated (step S58). Then, it is determined whether or not there is the subject having movement based on the calculation result (step S59). The determination here is made among the subjects set as the tracking targets. That is, it is determined whether or not the subject having movement (moving object) is present among the subjects set as the tracking targets.

In a case in which it is determined that the subject having movement is present among the subjects set as the tracking targets, that subject is excluded from the tracking targets (step S60). Here, the subject in which the movement amount equal to or larger than the threshold value is detected is excluded from the tracking targets.

It should be noted that, in a case in which all the subjects have movement, the subject having a larger movement amount is preferentially excluded. In this case, the subjects are excluded in a descending order of the movement amount. As a result, the subject having the smallest movement amount is set as the tracking target.

Thereafter, the tracking AF is performed on the subject set as the tracking target (step S61). Then, it is determined whether or not the focus operation is performed again (step S62), and in a case in which it is determined that the focus operation is restarted, the tracking AF is terminated. Thereafter, the operation in the normal MF mode is restored, and the processing after step S52 is repeated.

Figure 19:
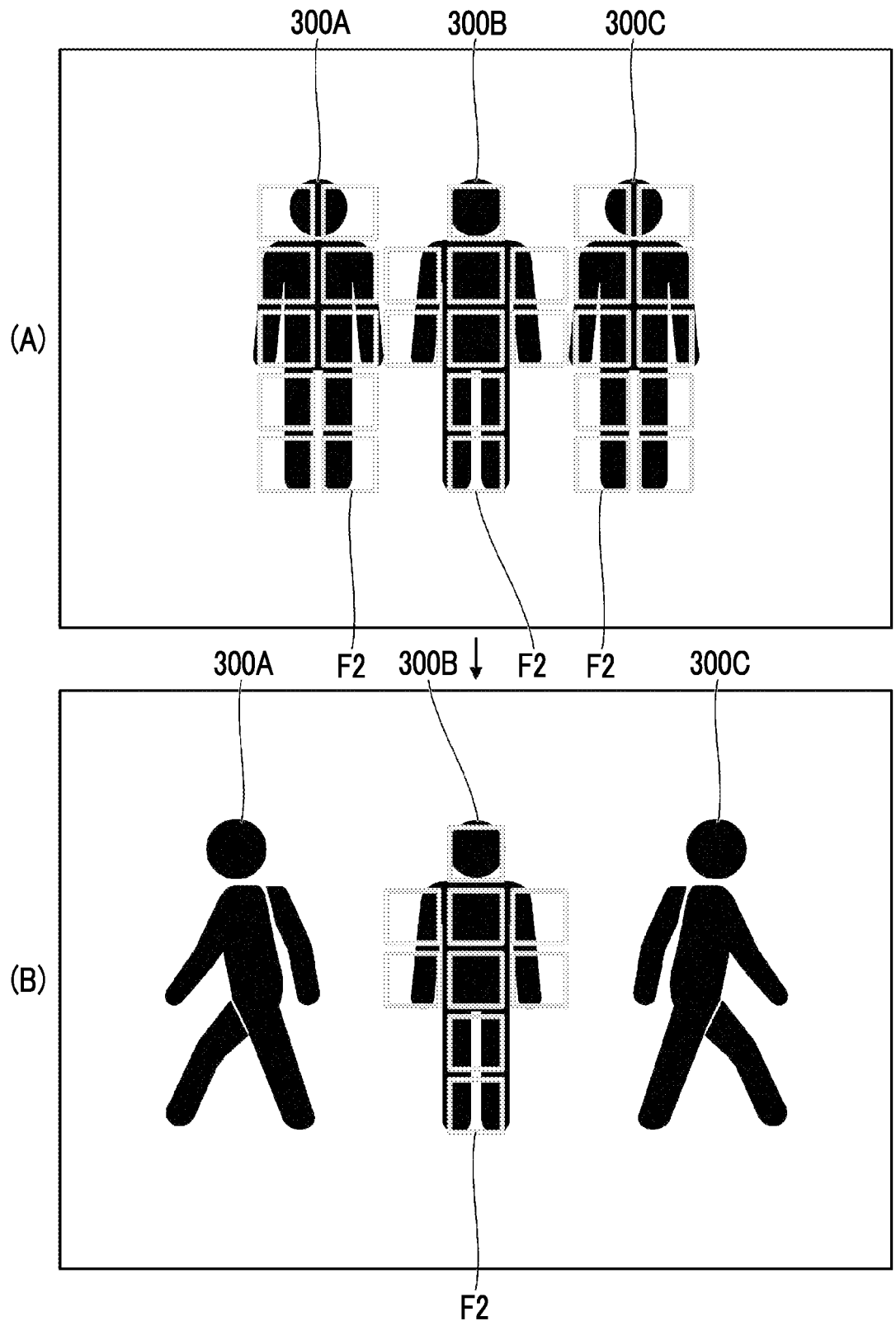
FIG. 19 is a conceptual diagram of setting of the tracking target.

FIG. 19 is a conceptual diagram of the setting of the tracking target.

A portion (A) in FIG. 19 shows an initial setting state of the tracking target. In this example, an example is shown in which three persons 300A, 300B, and 300C are present in the in-focus region at the time when the termination of the focus operation is sensed. In this case, all the persons 300A, 300B, and 300C are set as the tracking targets.

A portion (B) in FIG. 19 shows the setting state of the tracking target after a predetermined time has elapsed. In this example, an example is shown in which the left and right persons 300A and 300C move. In this case, the left and right persons 300A and 300C having movement are excluded from the tracking targets. Accordingly, only the central person 300B is selected as the tracking target.

As described above, with the imaging apparatus according to the present embodiment, in a case in which the plurality of subjects are set as the tracking targets, the tracking targets are set based on the subsequent movement amount of each subject, and the tracking AF is performed. As a result, it is possible to continuously perform focusing on the subject intended by the user. As a result, it is possible to reduce the load of the focus adjustment of the user. Also, stable focus movement can be realized.

Fifth Embodiment

In a case in which the plurality of subjects are set as the tracking targets, the imaging apparatus according to the present embodiment decides the tracking target by using phase difference information, and performs the tracking AF. Specifically, the movement amount of each subject in the optical axis direction is calculated by using the phase difference information, the tracking target is set with priority given to the subject having the smallest movement amount in the optical axis direction, and the tracking AF is performed. The optical axis direction is a direction along the optical axis of the imaging optical system 20. In the imaging apparatus according to the present embodiment, the optical axis direction of the imaging optical system 20 coincides with a direction orthogonal to a light-receiving surface of the imaging element.

[Apparatus Configuration]

Here, only the description of the function required for performing the tracking AF will be made.

Figure 20:
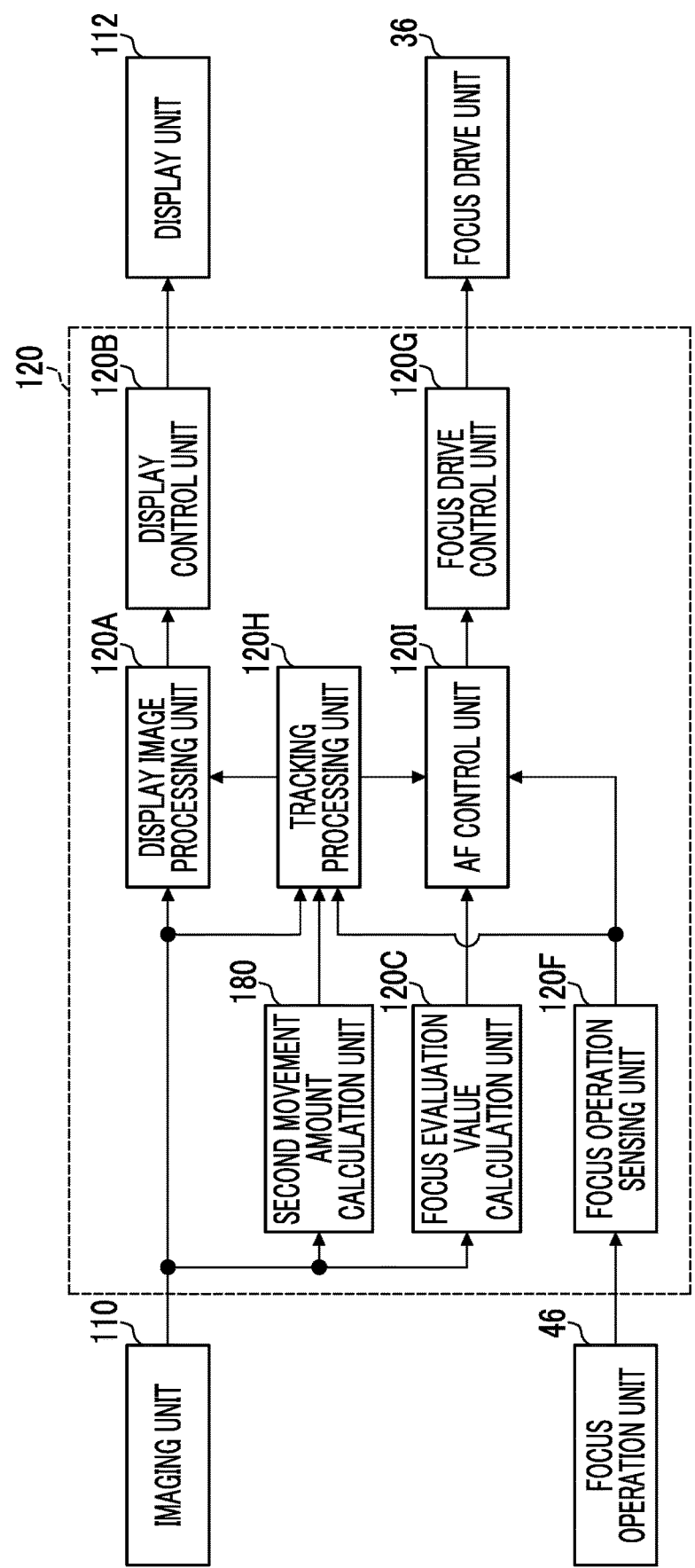
FIG. 20 is a block diagram of main functions realized by the CPU in a case in which the tracking AF is performed.

FIG. 20 is a block diagram of main functions realized by the CPU in a case in which the tracking AF is performed.

As shown in FIG. 20, in the imaging apparatus according to the present embodiment, the CPU 120 further functions as a second movement amount calculation unit 180.

The second movement amount calculation unit 180 processes the moving image data obtained by the imaging to calculate the movement amount of each subject in the optical axis direction. Specifically, the phase difference of each focus area is calculated based on a pixel signal of the phase-difference detection pixel, a change amount thereof is calculated, and the movement amount of each subject in the optical axis direction is calculated. Accordingly, in the imaging apparatus according to the present embodiment, the change amount in the phase difference is the movement amount in the optical axis direction.

In a case in which a plurality of subjects are set as the tracking targets, the tracking processing unit 120H sets the tracking target based on the information on the movement amount of each subject in the optical axis direction calculated by the second movement amount calculation unit 180, and performs the tracking processing. Specifically, the tracking processing is performed by excluding the subject having movement in the optical axis direction from the tracking targets. The subject having movement in the optical axis direction is the subject in which the movement amount in the optical axis direction is equal to or larger than the threshold value. In a case in which all the subjects have movement in the optical axis direction, the subjects are excluded in a descending order of the movement amount in the optical axis direction. As a result, the subject having the smallest movement amount in the optical axis direction is set as the tracking target, and the tracking AF is performed.

[Processing Procedure of Imaging Control]

Figure 21:
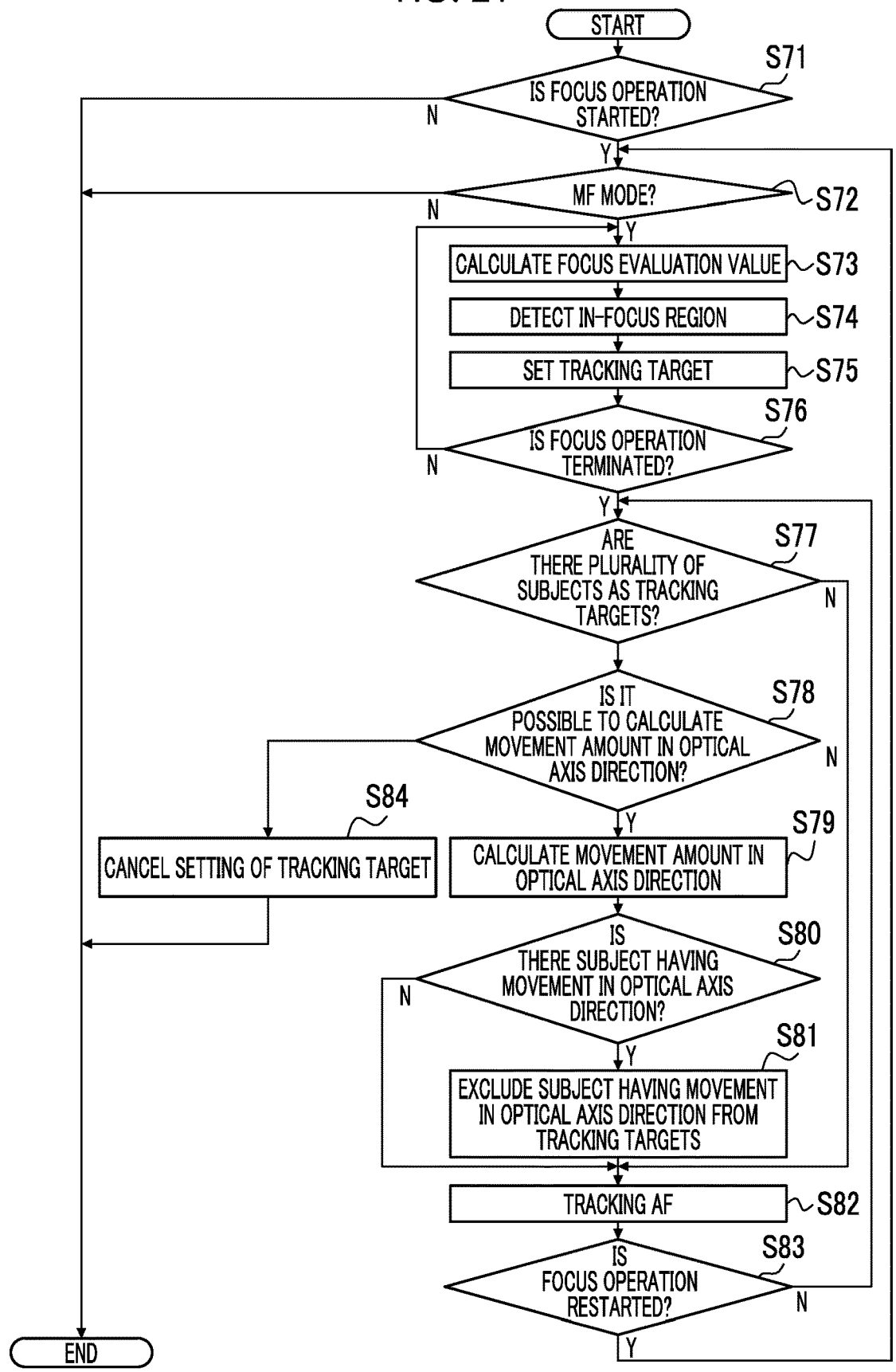
FIG. 21 is a flowchart showing a processing procedure of the imaging control.

FIG. 21 is a flowchart showing a processing procedure of the imaging control.

The processing (steps S71 to S76) until the tracking AF is started is the same as the processing of the imaging apparatus according to the first embodiment. Firstly, it is determined whether or not the focus operation is started (step S71). In a case in which the focus operation is started, it is determined whether or not the focus mode is set to the MF mode (step S72). In a case in which the MF mode is set, the focus evaluation value of each focus area is calculated (step S73), and the in-focus region is detected based on the calculation result (step S74). Then, the tracking target is set based on the information on the detected in-focus region (step S75). That is, the subject present in the in-focus region is set as the tracking target. Thereafter, it is determined whether or not the focus operation is terminated (step S76).

In a case in which it is determined that the focus operation is terminated, it is determined whether or not the plurality of subjects are set as the tracking targets (step S77). In a case in which it is determined that the plurality of subjects are not set as the tracking target, the tracking AF is performed on the subject set as the tracking target (step S82).

On the other hand, in a case in which it is determined that the plurality of subjects are set as the tracking targets, it is determined whether or not the movement amount in the optical axis direction can be calculated (step S78). As described above, in the imaging apparatus according to the present embodiment, the movement amount in the optical axis direction is calculated based on the phase difference. Accordingly, in a case in which the phase difference cannot be calculated, the movement amount in the optical axis direction cannot also be calculated. Accordingly, in a case in which the phase difference cannot be calculated, it is determined that the movement amount in the optical axis direction cannot be calculated. For example, in a case in which the subject is present in a region in which the phase-difference detection pixel is not disposed, it is determined that the phase difference cannot be calculated.

In a case in which it is determined that the movement amount in the optical axis direction cannot be calculated, the setting of the tracking target is cancelled (step S84), and the processing is terminated. After the processing is terminated, the operation in the normal MF mode is performed.

On the other hand, in a case in which it is determined that the movement amount in the optical axis direction can be calculated, the movement amount of each subject in the optical axis direction is calculated (step S79). Then, it is determined whether or not there is the subject having movement in the optical axis direction based on the calculation result (step S80). The determination here is made among the subjects set as the tracking targets. That is, it is determined whether or not the subject having movement in the optical axis direction is present among the subjects set as the tracking targets.

In a case in which it is determined that the subject having movement in the optical axis direction is present among the subjects set as the tracking targets, that subject is excluded from the tracking targets (step S81).

It should be noted that, in a case in which all the subjects have movement in the optical axis direction, the subject having a larger movement amount in the optical axis direction is preferentially excluded. In this case, the subjects are excluded in a descending order of the movement amount in the optical axis direction. As a result, the subject having the smallest movement amount in the optical axis direction is set as the tracking target.

Thereafter, the tracking AF is performed on the subject set as the tracking target (step S82). Then, it is determined whether or not the focus operation is performed again (step S83), and in a case in which it is determined that the focus operation is restarted, the tracking AF is terminated. Thereafter, the operation in the normal MF mode is restored, and the processing after step S52 is repeated.

Figure 22:
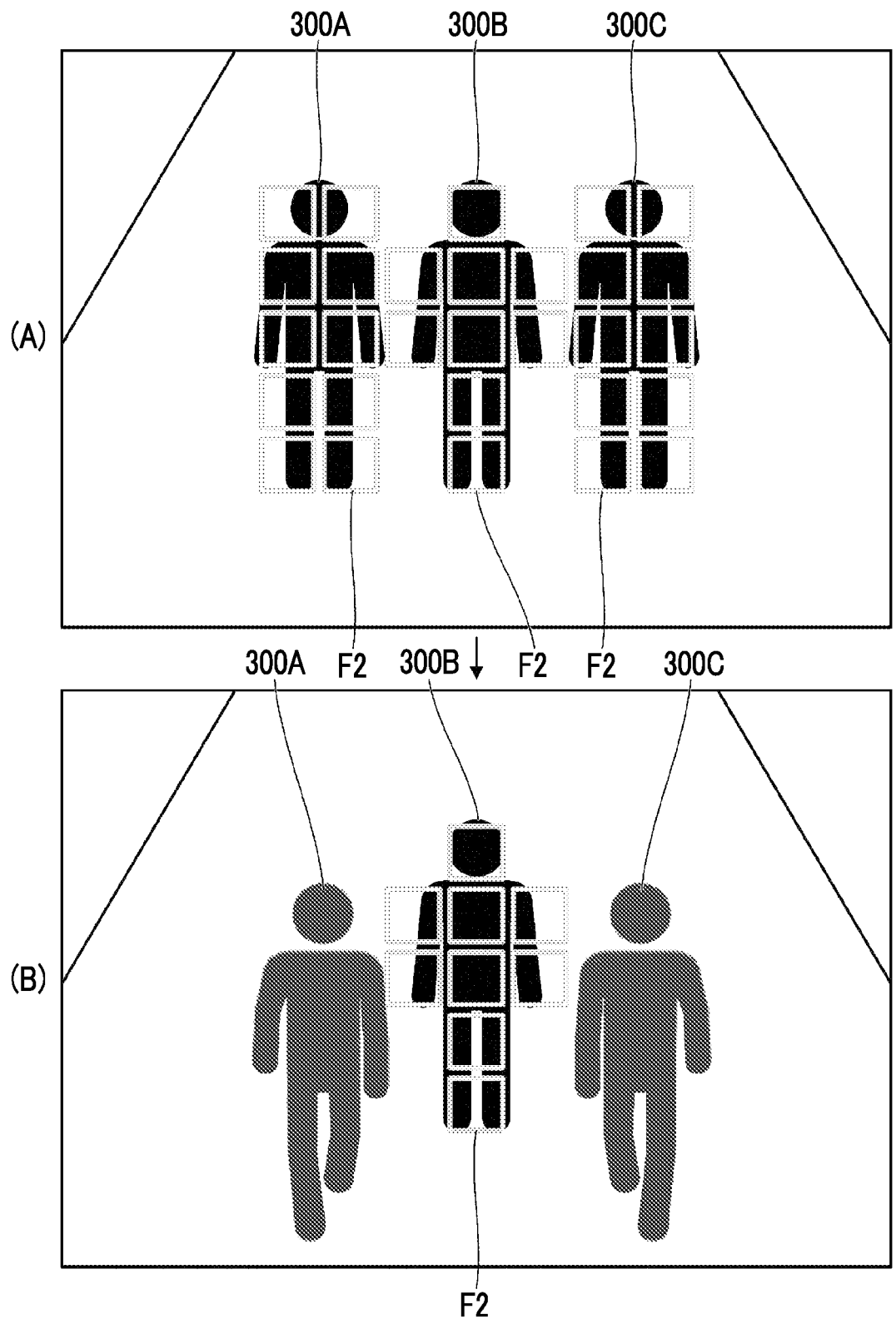
FIG. 22 is a conceptual diagram of the setting of the tracking target.

FIG. 22 is a conceptual diagram of the setting of the tracking target.

A portion (A) in FIG. 22 shows the initial setting state of the tracking target. In this example, an example is shown in which three persons 300A, 300B, and 300C are present in the in-focus region at the time when the termination of the focus operation is sensed. In this case, all the persons 300A, 300B, and 300C are set as the tracking targets.

A portion (B) in FIG. 22 shows the setting state of the tracking target after a predetermined time has elapsed. In this example, an example is shown in which the left and right persons 300A and 300C move forward (front side in the depth direction). That is, an example is shown in a case in which the left and right persons 300A and 300C move in the optical axis direction the imaging optical system 20. In this case, the left and right persons 300A and 300C having movement in the optical axis direction are excluded from the tracking targets. Accordingly, only the central person 300B is selected as the tracking target.

As described above, with the imaging apparatus according to the present embodiment, in a case in which the plurality of subjects are set as the tracking targets, the tracking targets are set based on the subsequent movement amount of each subject in the optical axis direction, and the tracking AF is performed. As a result, it is possible to continuously perform focusing on the subject intended by the user. As a result, it is possible to reduce the load of the focus adjustment of the user. Also, stable focus movement can be realized.

It should be noted that, in the embodiment described above, the configuration is adopted in which the change amount in the phase difference is detected to detect the movement amount of each subject in the optical axis direction, but the method of detecting the movement amount of each subject in the optical axis direction is not limited to this. In addition, a configuration can also be adopted in which the detection is performed by a time of flight (ToF) method, a structured light method, or the like.

In addition, in the embodiment described above, the configuration is adopted in which the phase difference is detected by using the imaging element comprising the phase-difference detection pixel, but the method of detecting the phase difference is not limited to this.

In addition, in a case in which the movement amount of the subject can be calculated over the entire range of the image, the processing of step S78 can be omitted. For example, in a case in which the focus area is set in the entire range of the image and the phase difference can be detected in each focus area, the processing of step S78 may be omitted.

Sixth Embodiment

In a case in which the plurality of subjects are set as the tracking targets, the imaging apparatus according to the present embodiment decides the tracking target by using the information on the movement amount of each subject in the image and the information on the movement amount of each subject in the optical axis direction, and performs the tracking AF. Specifically, while the tracking target is set with priority given to the subject having no movement, in a case in which all the subjects have movement, the tracking target is decided based on the movement amount in the optical axis direction, and the tracking AF is performed. That is, the tracking target is set with priority given to the subject having the smallest movement amount in the optical axis direction, and the tracking AF is performed.

[Apparatus Configuration]

Here, only the description of the function required for performing the tracking AF will be made.

Figure 23:
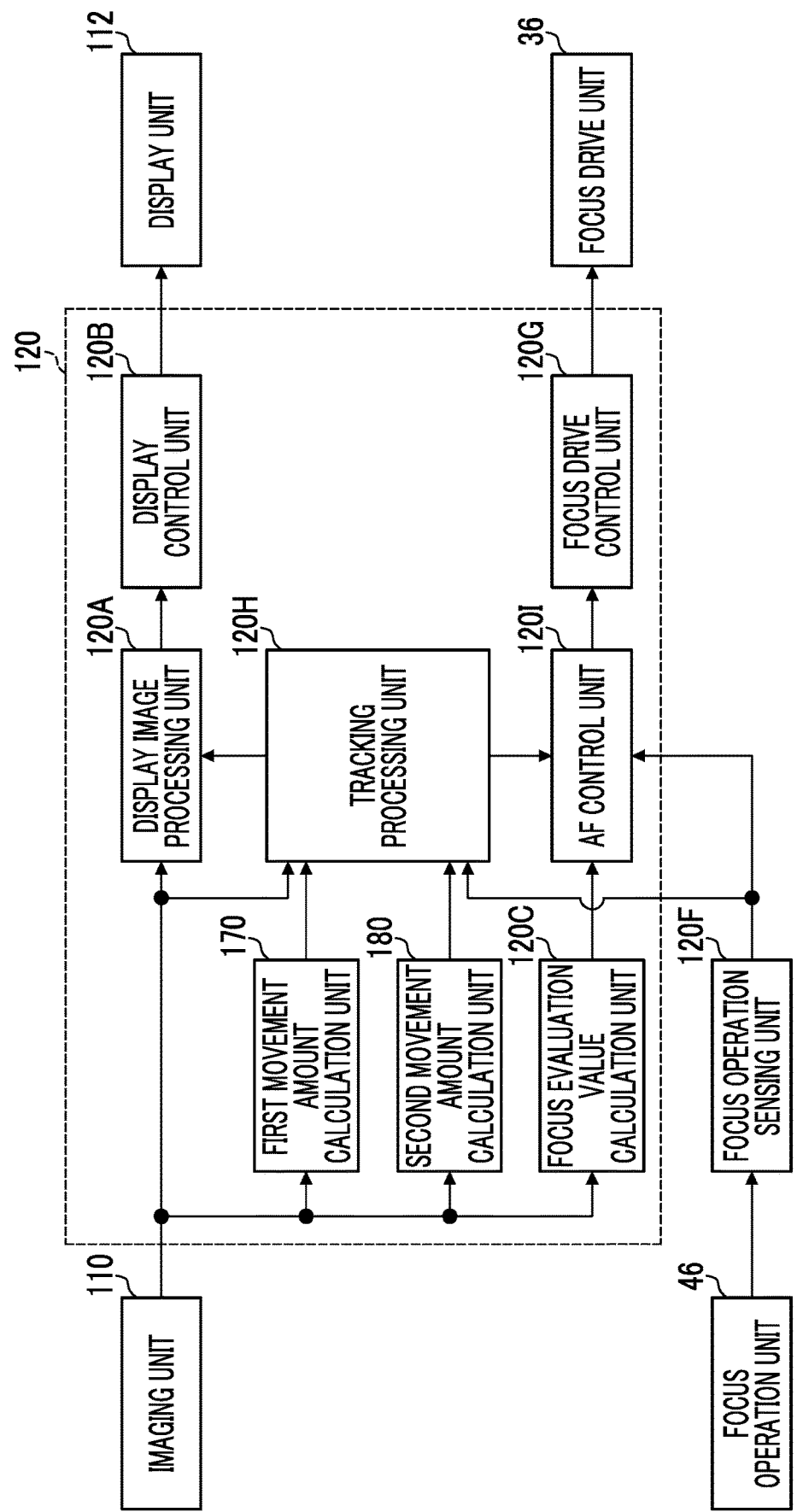
FIG. 23 is a block diagram of main functions realized by the CPU in a case in which the tracking AF is performed.

FIG. 23 is a block diagram of main functions realized by the CPU in a case in which the tracking AF is performed.

As shown in FIG. 23, in the imaging apparatus according to the present embodiment, the CPU 120 further functions as the first movement amount calculation unit 170 and the second movement amount calculation unit 180.

The function of the first movement amount calculation unit 170 is the same as the function of the first movement amount calculation unit 170 provided in the imaging apparatus according to the fourth embodiment. That is, the moving image data obtained by the imaging is processed, and the movement amount (movement vector) of the subject in the image represented by the moving image data is calculated.

The function of the second movement amount calculation unit 180 is the same as the function of the second movement amount calculation unit 180 provided in the imaging apparatus according to the fifth embodiment. That is, the moving image data obtained by the imaging is processed, and the movement amount (change amount of the phase difference) of each subject in the optical axis direction is calculated.

In a case in which the plurality of subjects are set as the tracking targets, the tracking processing unit 120H sets the tracking target based on the calculation results of the first movement amount calculation unit 170 and the second movement amount calculation unit 180, and performs the tracking processing.

[Processing Procedure of Imaging Control]

Figure 24:
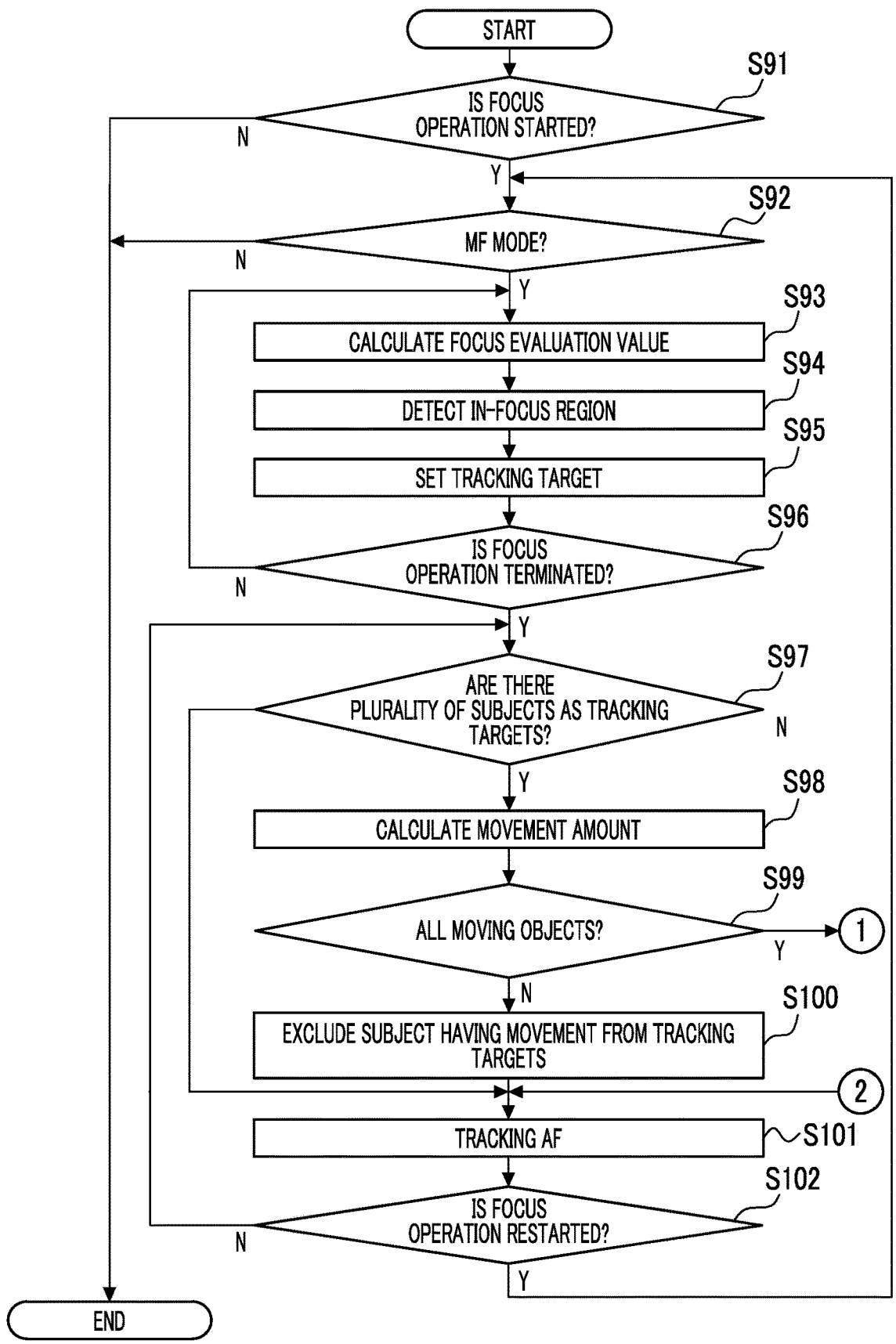
FIG. 24 is a flowchart showing a processing procedure of the imaging control.
Figure 25:
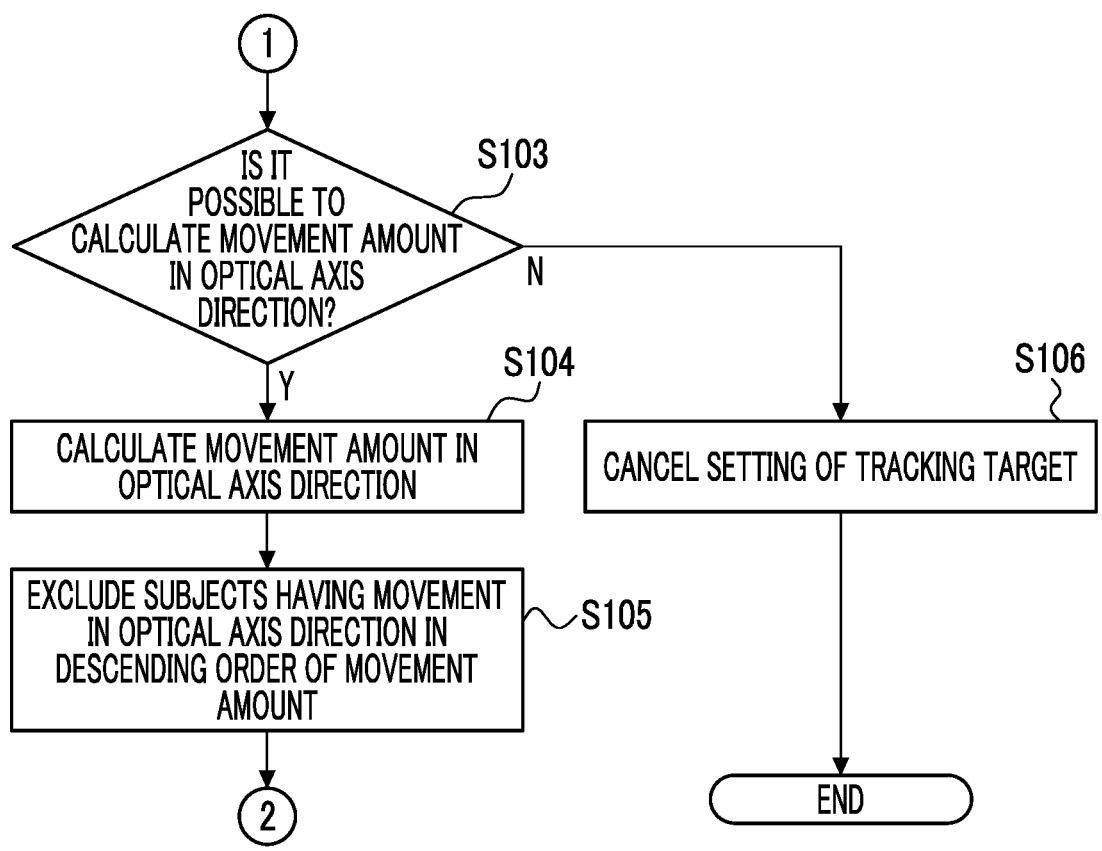
FIG. 25 is a flowchart showing a processing procedure of the imaging control.

FIG. 24 and FIG. 25 are flowcharts showing processing procedures of the imaging control.

The processing (steps S91 to S96) until the tracking AF is started is the same as the processing of the imaging apparatus according to the first embodiment. Firstly, it is determined whether or not the focus operation is started (step S91). In a case in which the focus operation is started, it is determined whether or not the focus mode is set to the MF mode (step S92). In a case in which the MF mode is set, the focus evaluation value of each focus area is calculated (step S93), and the in-focus region is detected based on the calculation result (step S94). Then, the tracking target is set based on the information on the detected in-focus region (step S95). That is, the subject present in the in-focus region is set as the tracking target. Thereafter, it is determined whether or not the focus operation is terminated (step S96).

In a case in which it is determined that the focus operation is terminated, it is determined whether or not the plurality of subjects are set as the tracking targets (step S97). In a case in which it is determined that the plurality of subjects are not set as the tracking target, the tracking AF is performed on the subject set as the tracking target (step S101).

On the other hand, in a case in which it is determined that the plurality of subjects are set as the tracking targets, the movement amount of each subject in the image is calculated (step S98). Then, it is determined whether or not all the subjects are the moving objects based on the calculation result (step S99). That is, it is determined whether or not all the subjects set as the tracking targets are the subjects having movement.

In a case in which not all the subjects set as the tracking targets are the moving objects, that is, in a case in which the subject having no movement (subject of which the movement amount is equal to or smaller than the threshold value) is included, the subject having movement is excluded from the tracking targets (step S100). That is, the subject in which the movement amount equal to or larger than the threshold value is detected is excluded from the tracking targets.

Thereafter, the tracking AF is performed on the subject set as the tracking target (step S101). Then, it is determined whether or not the focus operation is performed again (step S102), and in a case in which it is determined that the focus operation is restarted, the tracking AF is terminated. Thereafter, the operation in the normal MF mode is restored, and the processing after step S92 is repeated.

On the other hand, in step S99, in a case in which it is determined that all the subjects set as the tracking targets are the moving objects, the processing transitions to the flow shown in FIG. 25. That is, it is determined whether or not the movement amount in the optical axis direction can be calculated (step S103). Whether or not the movement amount in the optical axis direction can be calculated is determined by whether or not the phase difference can be calculated for each subject. In a case in which the subject for which the phase difference cannot be calculated is present, it is determined that the movement amount in the optical axis direction cannot be calculated.

In a case in which it is determined that the movement amount in the optical axis direction cannot be calculated, the setting of the tracking target is cancelled (step S106), and the processing is terminated. After the processing is terminated, the operation in the normal MF mode is performed.

On the other hand, in a case in which it is determined that the movement amount in the optical axis direction can be calculated, the movement amount of each subject in the optical axis direction is calculated (step S104). Then, the subjects having movement in the optical axis direction are excluded from the tracking targets in a descending order of the movement amount based on the calculation result (step S105). As a result, the subject having the smallest movement amount in the optical axis direction is set as the tracking target.

Thereafter, as shown in FIG. 24, the tracking AF is performed on the subject set as the tracking target (step S101). Then, it is determined whether or not the focus operation is performed again (step S102), and in a case in which it is determined that the focus operation is restarted, the tracking AF is terminated. Thereafter, the operation in the normal MF mode is restored, and the processing after step S92 is repeated.

As described above, with the imaging apparatus according to the present embodiment, the tracking target is set based on the information on the movement amount of each subject in the image and the information on the movement amount of each subject in the optical axis direction, and the tracking AF is performed. As a result, it is possible to continuously perform focusing on the subject intended by the user. As a result, it is possible to reduce the load of the focus adjustment of the user. Also, stable focus can be realized. That is, the focusing can be performed as much as possible.

Seventh Embodiment

In the imaging apparatus according to the present embodiment, the tracking target is set based on the focus state of each subject during the focus operation. Specifically, in a case in which the subject, which is changed from the in-focus state to an out-of-focus state during the focus operation and then restored to the in-focus state again, is present, the subject is set as the tracking target. The operation of changing from the in-focus state to the out-of-focus state and then restoring to the in-focus state again is a so-called restoration operation. The restoration operation is an operation of restoring the focus immediately after the blurriness in the focus operation. In a case in which the user performs the restoration operation, it is considered that the subject which is in focus due to the restoration operation is a main subject. Accordingly, the subject is set as the tracking target, and the tracking AF is performed. In a case in which the subject, which is changed from the in-focus state to the out-of-focus state during the focus operation and then restored to the in-focus state again, is not present, the subject which is in focus for the longest time during the focus operation is set as the tracking target.

[Apparatus Configuration]

Here, only the description of the function required for setting the tracking target will be made.

Figure 26:
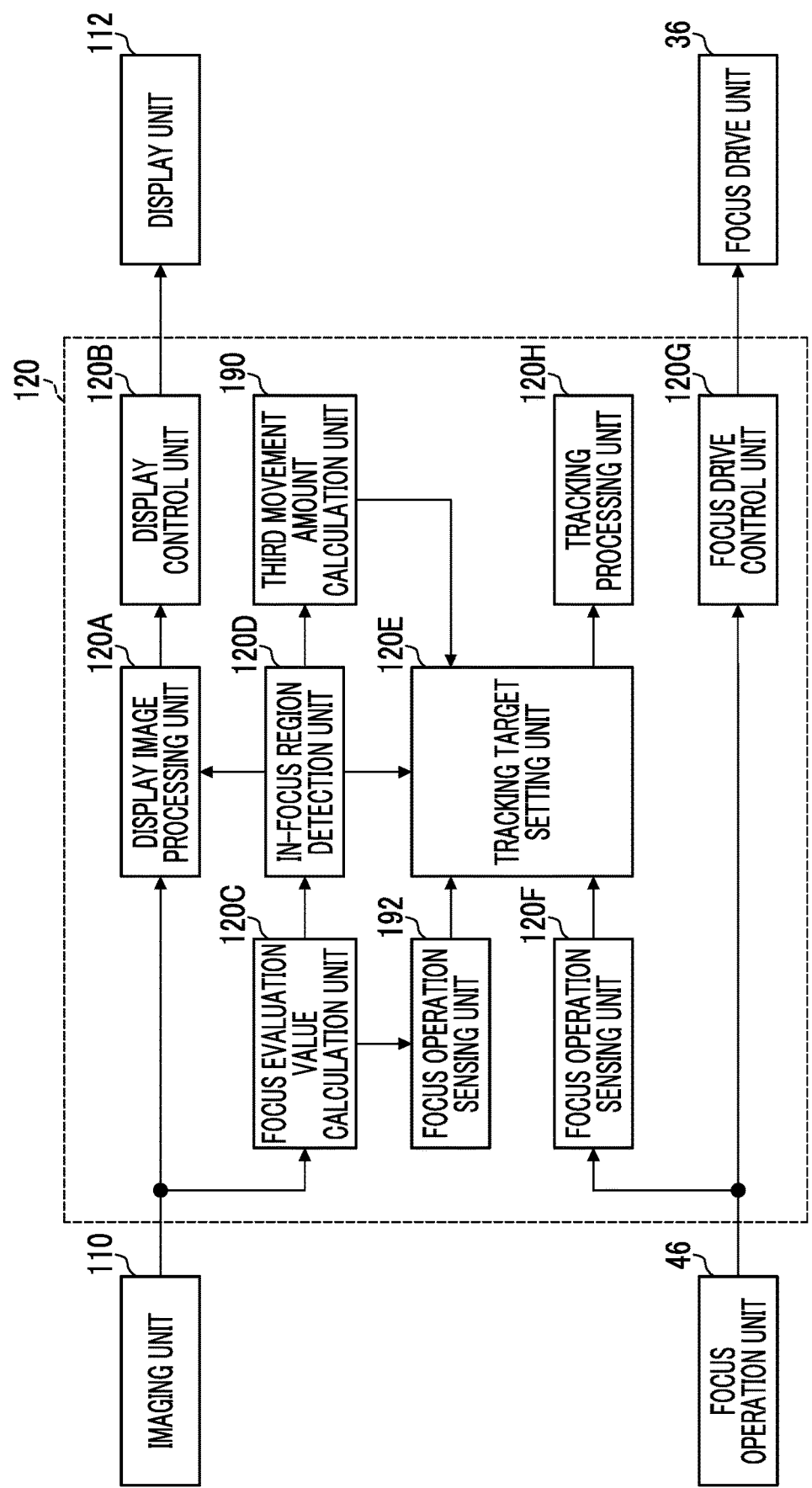
FIG. 26 is a block diagram of main functions realized by the CPU in a case in which the tracking AF is performed.

FIG. 26 is a block diagram of main functions realized by the CPU in a case in which the tracking AF is performed.

As shown in FIG. 26, in the imaging apparatus according to the present embodiment, the CPU 120 further functions as a third timing unit 190 and a specific operation detection unit 192.

The third timing unit 190 measures a period of the in-focus state (in-focus period) for each focus area during the focus operation. The third timing unit 190 measures the in-focus period of each focus area based on the information on the in-focus region detected in real time by the in-focus region detection unit 120D.

The specific operation detection unit 192 detects a specific operation based on the information on the focus evaluation value calculated in real time. That is, an operation of focusing by restoration is detected. The specific operation detection unit 192 detects an operation of changing from the in-focus state to the out-of-focus state and then restoring to the in-focus state within a prescribed time, and detects the operation of focusing by restoration.

The tracking target setting unit 120E sets the tracking target based on the detection result of the in-focus region detection unit 120D, the measurement result of the third timing unit 190, and the detection result of the specific operation detection unit 192. Specifically, in a case in which a single subject is present in the in-focus region, the tracking target setting unit 120E sets the subject present in the in-focus region as the tracking target. On the other hand, in a case in which the plurality of subjects are present in the in-focus region, the tracking target setting unit 120E sets the tracking target with priority given to the subject which is in focus by the restoration operation. In a case in which the subject which is in focus by the restoration operation is not present, the subject having the longest period of the in-focus state is set as the tracking target.

[Processing Procedure of Imaging Control]

Figure 27:
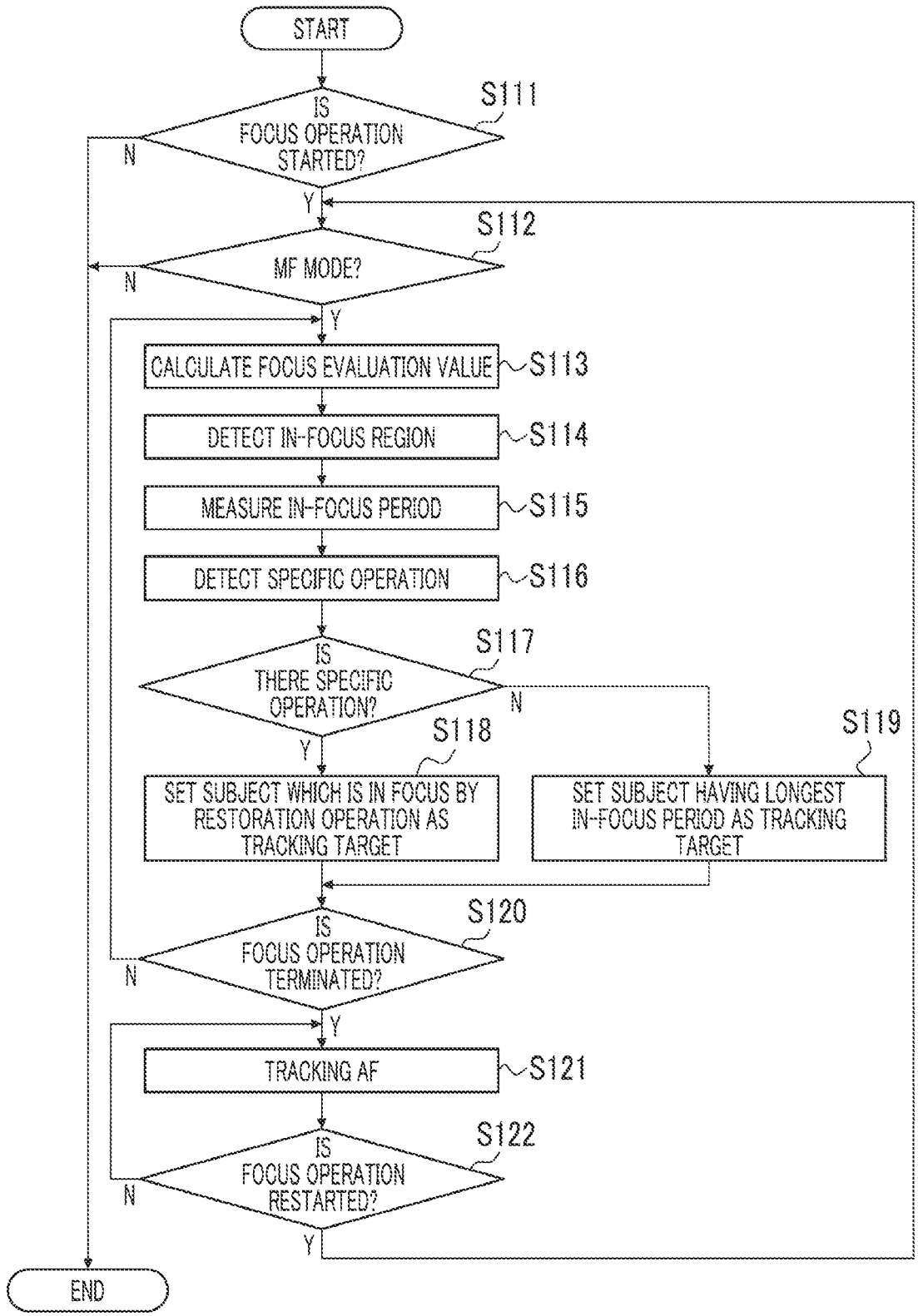
FIG. 27 is a flowchart showing a processing procedure of the imaging control.

FIG. 27 is a flowchart showing a processing procedure of the imaging control.

Firstly, it is determined whether or not the focus operation is started (step S111). In a case in which it is determined that the focus operation is started, it is determined whether or not the focus mode is set to the MF mode (step S112). In a case in which it is determined that the focus mode is set to the MF mode, the focus evaluation value of each focus area is calculated (step S113). The in-focus region is detected based on the calculation result (step S114). In a case in which the in-focus region is detected, the in-focus period of each focus area is measured based on the detection result (step S115). In addition, the specific operation, that is, the operation of focusing by restoration is detected based on the calculation result of each focus evaluation value. Then, it is determined whether or not there is the specific operation based on the detection result (step S117).

In a case in which the specific operation is performed, the subject which is in focus is set as the tracking target by the specific operation (step S118). That is, the subject which is in focus is set as the tracking target by restoration.

On the other hand, in a case in which the specific operation is not performed, the subject having the longest in-focus period is specified from among the subjects present in the in-focus region, and the specified subject is set as the tracking target (step S119).

After the tracking target is set, it is determined whether or not the focus operation is terminated (step S120). Then, in a case in which it is determined that the focus operation is terminated, the tracking AF is started (step S121). That is, the tracking processing and the AF control are continuously performed on the subject set as the tracking target.

In a case in which the tracking AF is started, it is determined whether or not the focus operation is performed again (step S122). Then, in a case in which it is determined that the focus operation is restarted, the tracking AF is terminated. After the tracking AF is terminated, the operation in the normal MF mode is restored, and the processing after step S2 is repeated.

As described above, with the imaging apparatus according to the present embodiment, even in a case in which the plurality of subjects are present in the in-focus region, the subject assumed as the main subject can be automatically set as the tracking target, and the tracking AF can be performed.

It should be noted that, in the embodiment described above, the configuration is adopted in which the specific operation is detected and the tracking target is set, but a configuration can also be adopted in which the tracking target is set without detecting the specific operation. In this case, the subject having the longest in-focus period is set as the tracking target.

Similarly, a configuration can also be adopted in which the tracking target is set without measuring the in-focus period. That is, even in a case in which the specific operation is not detected, the tracking target can be set without being limited to the subject having the longest in-focus period. It should be noted that, in this case, in a case in which the plurality of subjects are present in the in-focus region, all the subjects are set as the tracking targets. However, in a case in which the plurality of subjects are set as the tracking targets and the tracking AF is started, the tracking target can be limited by the methods described in the fourth to sixth embodiments.

Eighth Embodiment

During the tracking AF, the subject which is the tracking target is continued to be in focus. On the other hand, in a case in which another subject is within a range of a depth of field, the subject is also in focus. The subject other than the tracking target which is in focus may be a passing subject or can be the main subject.

Therefore, in the imaging apparatus according to the present embodiment, in a case in which the subject that can be the main subject is detected during the tracking AF, the subject is added to the tracking target and the tracking AF is continued. Specifically, in a case in which the same degree of the focus evaluation value as the focus evaluation value of the subject which is the current tracking target is maintained for a certain time, a new subject is also set as the tracking target, and the tracking AF is performed.

[Apparatus Configuration]

Here, only the description of the function required for the additional setting of the tracking target will be made.

Figure 28:
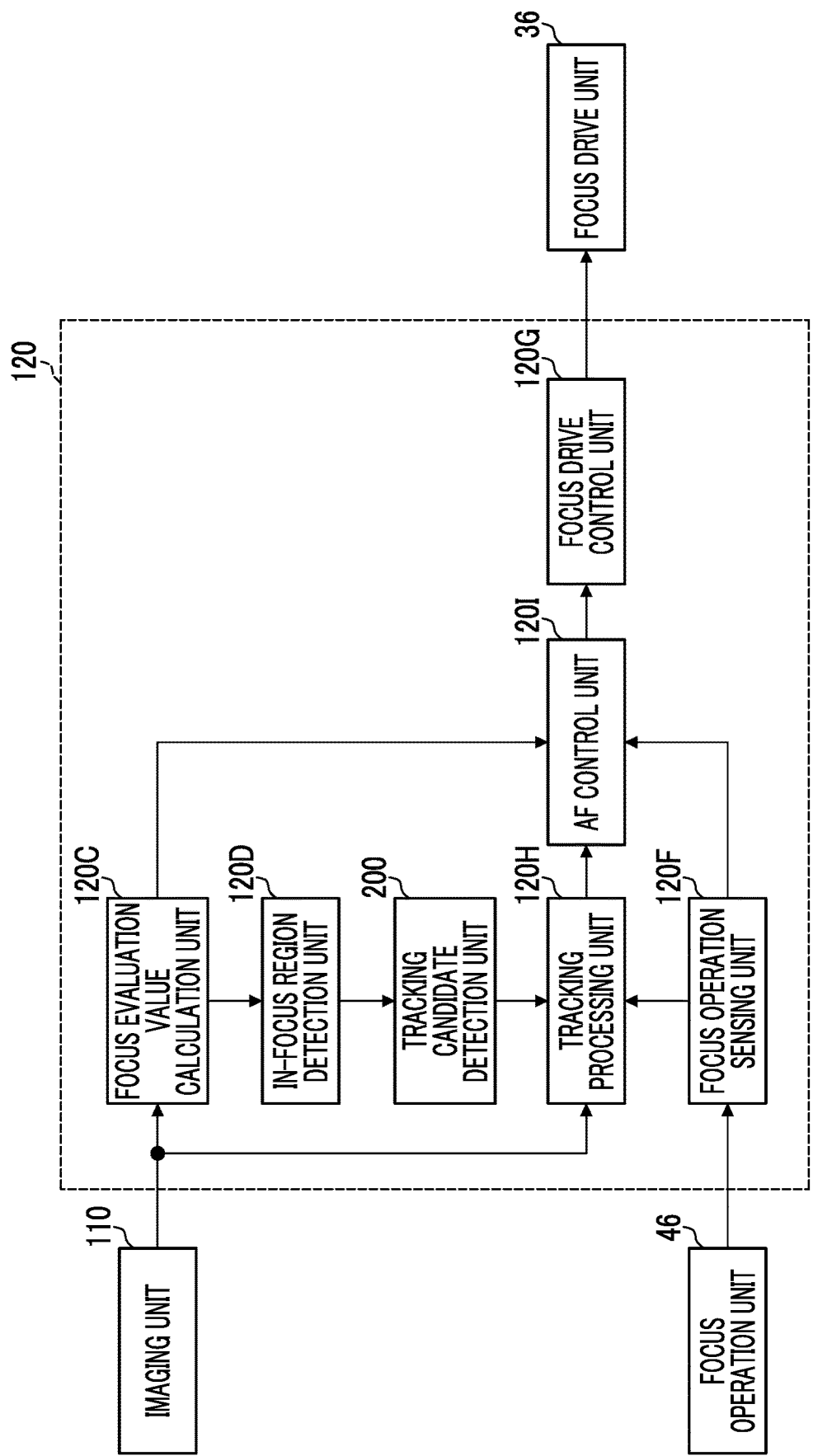
FIG. 28 is a block diagram of main functions realized by the CPU in a case in which the tracking target is added and the tracking AF is performed.

FIG. 28 is a block diagram of main functions realized by the CPU in a case in which the tracking target is added and the tracking AF is performed.

As shown in FIG. 28, in the imaging apparatus according to the present embodiment, the CPU 120 further functions as a tracking candidate detection unit 200.

The tracking candidate detection unit 200 detects a tracking candidate based on the information on the in-focus region detected by the in-focus region detection unit 120D during the tracking AF. The tracking candidate is the subject that can be the main subject other than the subject currently set as the tracking target. The tracking candidate detection unit 200 extracts, as the tracking candidate, the subject having the same degree of the focus evaluation value as the focus evaluation value of the subject currently set as the tracking target continuously for a time equal to or longer than a certain time. The same degree means that a difference is equal to or smaller than a threshold value. Accordingly, the tracking candidate detection unit 200 detects the tracking candidate by extracting the subject of which a state in which difference from the focus evaluation value of the subject currently set as the tracking target is equal to or smaller than the threshold value is continued for a time equal to or longer than the prescribed time. Specifically, the focus area in which a state being equal to or smaller than the threshold value is continued for a time equal to or longer than the prescribed time is extracted, and the subject present in the focus area is detected as the tracking candidate. The prescribed time used for extraction is an example of a third time.

It should be noted that during the tracking AF, the subject which is the tracking target is in the in-focus state (including a state in which the subject is substantially recognized as the in-focus state) for approximately the entire period. Accordingly, the subject in the in-focus state can be regarded as the subject having the same degree of the focus evaluation value as the focus evaluation value of the subject which is the tracking target. Accordingly, the tracking candidate detection unit 200 can also be configured to extract the subject in the in-focus state as the tracking candidate continuously for a time equal to or longer than a certain time. In this case, the tracking candidate detection unit 200 extracts a region that is in the in-focus state continuously for a time equal to or longer than the prescribed time other than the region in which the tracking target is present, and detects the subject present in the extracted region as the tracking candidate. Specifically, the focus area in the in-focus state is extracted continuously for a time equal to or longer than the prescribed time, and the subject present in the extracted focus area is detected as the tracking candidate.

In a case in which the tracking candidate is detected by the tracking candidate detection unit 200, the tracking processing unit 120H adds the detected tracking candidate to the tracking target and performs the tracking processing.

[Processing Procedure of Imaging Control]

Figure 29:
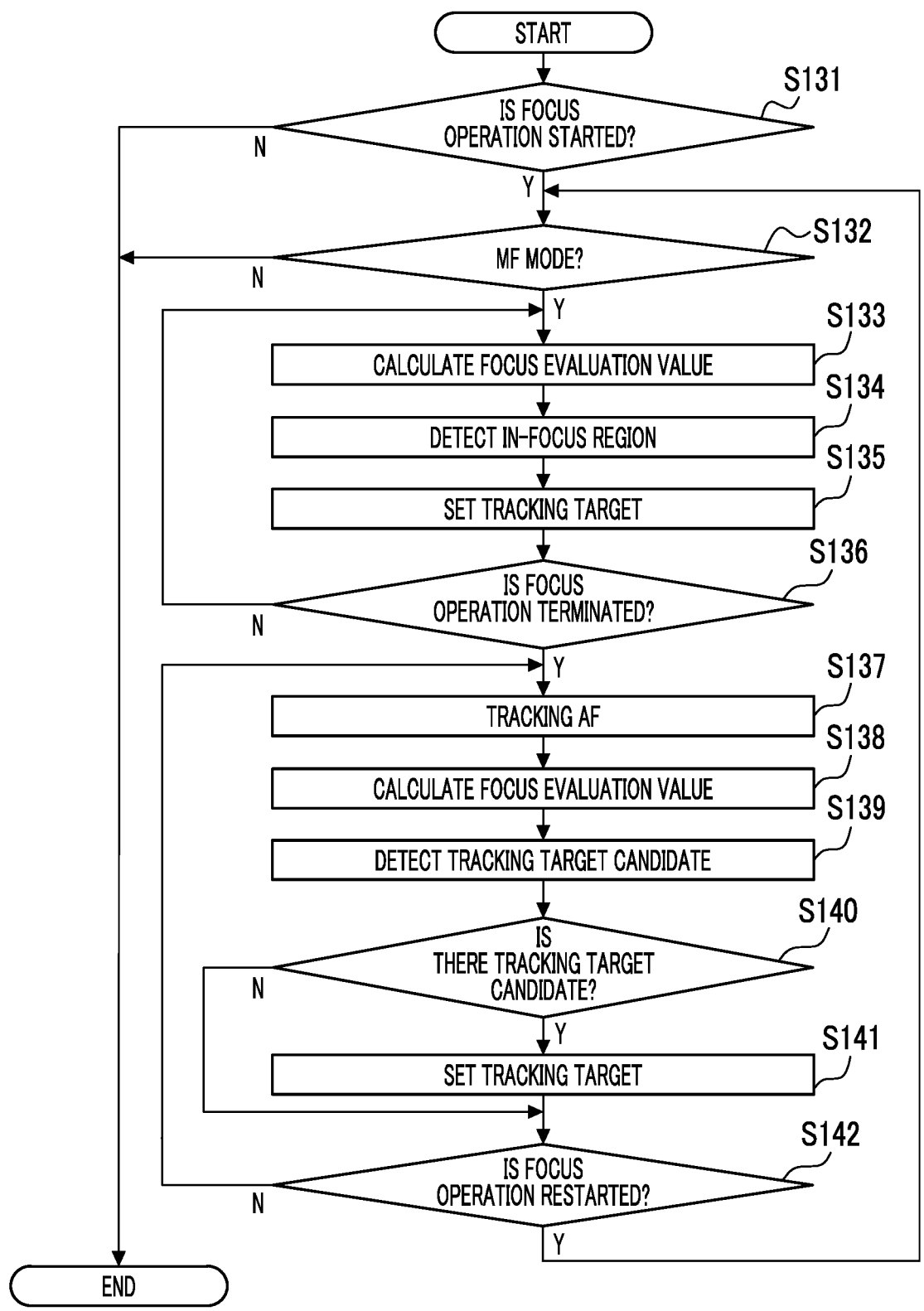
FIG. 29 is a flowchart showing a processing procedure of the imaging control.

FIG. 29 is a flowchart showing a processing procedure of the imaging control.

The processing (steps S131 to S137) until the tracking AF is started is the same as the processing of the imaging apparatus according to the first embodiment.

Firstly, it is determined whether or not the focus operation is started (step S131). In a case in which it is determined that the focus operation is started, it is determined whether or not the focus mode is set to the MF mode (step S132). In a case in which it is determined that the MF mode is set, the focus evaluation value of each focus area is calculated (step S133), and the in-focus region is detected based on the calculation result (step S134). Then, the tracking target is set based on the information on the detected in-focus region (step S135). In a case in which the tracking target is set, it is determined whether or not the focus operation is terminated (step S136). In a case in which it is determined that the focus operation is terminated, the tracking AF is started (step S137).

In a case in which the tracking AF is started, the focus evaluation value is calculated (step S138). The focus evaluation value is detected in the entire range of the screen. Then, the tracking candidate is detected based on the information on the detected focus evaluation value of the entire range of the screen (step S139).

The tracking candidate is detected by the following procedure. Firstly, the subject having the same degree of the focus evaluation value as the focus evaluation value of the subject currently set as the tracking target is extracted. Specifically, the focus area in which the difference from the focus evaluation value of the subject currently set as the tracking target is equal to or smaller than the threshold value is extracted. In a case in which the focus area in which the difference is equal to or smaller than the threshold value is extracted, the duration time of the state in which the difference is equal to or smaller than the threshold value is measured. In a case in which the state in which the difference is equal to or smaller than the threshold value is continued for a time equal to or longer than the prescribed time, the subject present in the extracted focus area is detected as the tracking candidate.

In a case in which the tracking candidate is detected, the tracking target is reset (step S142). That is, the detected tracking candidate is newly added to the tracking target and set.

Thereafter, it is determined whether or not the focus operation is performed again (step S143). In a case in which it is determined that the focus operation is restarted, the tracking AF is forcibly terminated. After the tracking AF is terminated, the operation in the normal MF mode is restored, and the processing after step S132 is repeated.

On the other hand, in a case in which it is determined that the focus operation is not restarted, the tracking AF is continuously performed. That is, the processing after step S137 is repeated. In this case, in a case in which the tracking target is newly added, the tracking AF is performed including the newly added tracking target.

As described above, with the imaging apparatus according to the present embodiment, in a case in which the subject that can be the main subject is detected during the tracking AF, the detected subject is automatically added to the tracking target, and the tracking AF is performed. As a result, the burden of the focus operation by the user can be greatly reduced. In addition, stable focus movement can be realized during the imaging of the moving image.

Other Embodiments

Example of Imaging Apparatus

The imaging apparatus to which the present invention is applied includes an imaging apparatus incorporated in a smartphone, a personal computer, or the like, in addition to an imaging apparatus dedicated to the imaging of the moving image, such as a so-called video camera and a cine camera.

[Hardware Configuration of Processing Unit]

In the present invention, a hardware structure of the processing unit that performs each processing is realized by various processors. The various processors include the CPU and/or a graphic processing unit (GPU) that is a general-purpose processor executing the program and functioning as the various processing units, a programmable logic device (PLD) that is a processor of which a circuit configuration can be changed after manufacture, such as a field programmable gate array (FPGA), and a dedicated electric circuit that is a processor having a circuit configuration that is designed for exclusive use in order to execute specific processing, such as an application specific integrated circuit (ASIC). The program is synonymous with software.

One processing unit may be configured by one of these various processors or may be configured by two or more processors of the same type or different types. For example, one processing unit may be configured by a plurality of FPGAs or a combination of the CPU and the FPGA. Also, a plurality of processing units may be configured by one processor. As a first example in which the plurality of processing units are configured by one processor, there is a form in which one processor is configured by a combination of one or more CPUs and the software, and this processor functions as the plurality of processing units as represented by a computer used in a client or a server. Second, as represented by a system on chip (SoC) or the like, there is a form in which a processor, which realizes the functions of the entire system including the plurality of processing units with one integrated circuit (IC) chip, is used. In this way, various processing units are configured by one or more of the various processors described above, as the hardware structure.

EXPLANATION OF REFERENCES

1: imaging apparatus
10: lens portion
20: imaging optical system
22: zoom lens
24: stop
26: focus lens
30: lens drive unit
32: zoom drive unit
34: stop drive unit
36: focus drive unit
40: lens operation unit
42: zoom operation unit
44: stop operation unit
46: focus operation unit
50: posture detection sensor
100: body part
110: imaging unit
110A: imaging element
112: display unit
114: storage unit
116: connection unit
118: body operation unit
120: CPU
120A: display image processing unit
120B: display control unit
120C: focus evaluation value calculation unit
120D: in-focus region detection unit
120E: tracking target setting unit
120F: focus operation sensing unit
120G: focus drive control unit
120H: tracking processing unit
120I: AF control unit
122: ROM
124: RAM
114A: measurement result storage unit
130A: first timing unit
130B: measurement result recording control unit
130C: sensing time calculation unit
130D: sensing time setting unit
140: image recognition unit
150A: focus movement direction sensing unit
150B: second timing unit
160: posture change sensing unit
170: first movement amount calculation unit
180: second movement amount calculation unit
190: third timing unit
192: specific operation detection unit
200: tracking candidate detection unit
300: person
300A: person 300B: person
300C: person
400: tree
F1: frame of focus area in in-focus state
F2: frame of focus area in in-focus state
F3: frame of focus area in in-focus state
FA: focus area
IM1: image displayed during focus operation
IM2: image displayed during tracking AF
L: optical axis
S1 to S8: processing procedure of imaging control
S11 to S20: processing procedure of imaging control
S31 to S40: processing procedure of imaging control
S51 to S62: processing procedure of imaging control
S71 to S83: processing procedure of imaging control
S91 to S106: processing procedure of imaging control
S111 to S122: processing procedure of imaging control
S131 to S142: processing procedure of imaging control

What is claimed is:

1. An imaging apparatus comprising:
an imaging optical system;
an imaging element; and
a processor,
wherein, in a first focus mode, the processor
outputs moving image data captured by the imaging element via the imaging optical system to a display destination,
detects an in-focus region in an image represented by the moving image data based on the moving image data,
senses, in a case in which a focus operation is performed, a termination of the focus operation based on a time related to the focus operation,
senses a movement direction of a focus immediately before the termination of the focus operation is sensed,
sets, in a case in which the termination of the focus operation is sensed, a subject present in the in-focus region as a tracking target to continuously perform tracking processing and auto focus control, and limits the movement direction of the focus by the auto focus control to the movement direction of the focus immediately before the termination of the focus operation is sensed, in a period from starts of the tracking processing and the auto focus control until a second time elapses, and
terminates, in a case in which the focus operation is performed again after the tracking processing and the auto focus control are started, the tracking processing and the auto focus control.

2. The imaging apparatus according to claim 1,
wherein the time related to the focus operation is a time of a non-operation state.

3. The imaging apparatus according to claim 2,
wherein the processor
measures a duration time of the non-operation state, and
senses the termination of the focus operation by sensing that a first time has elapsed from a start of the non-operation state.

4. The imaging apparatus according to claim 3,
wherein the processor
records information on the duration time of the non-operation state, and
sets the first time based on the recorded information on the duration time of the non-operation state.

5. The imaging apparatus according to claim 4,
wherein the processor sets the first time by calculation using a statistical method based on the recorded information on the duration time of the non-operation state.

6. The imaging apparatus according to claim 5,
wherein the processor calculates an average value, a median value, or a mode value of the duration times of the non-operation states for a most recent prescribed number of times as the first time.

7. The imaging apparatus according to claim 1,
wherein the processor gives information indicating the in-focus region to the image represented by the moving image data to output the moving image data to the display destination.

8. The imaging apparatus according to claim 7,
wherein the processor changes a content of the information indicating the in-focus region according to sensing of the termination of the focus operation.

9. The imaging apparatus according to claim 1,
wherein the processor
acquires information on a posture of an apparatus body, and
terminates, in a case in which the posture of the apparatus body is changed after the tracking processing and the auto focus control are started, the tracking processing and the auto focus control.

10. The imaging apparatus according to claim 1,
wherein, in a case in which a plurality of the subjects are set as the tracking targets, the processor
calculates a movement amount of each of the subjects, and
sets the tracking target based on the calculated movement amount.

11. The imaging apparatus according to claim 10,
wherein the processor sets the subject having no movement or the subject having a smallest movement amount as the tracking target.

12. The imaging apparatus according to claim 10,
wherein the movement amount includes a movement amount of the imaging optical system in an optical axis direction, and
in a case in which it is determined that all the subjects have movement, the processor sets the subject having a smallest movement amount in the optical axis direction as the tracking target.

13. The imaging apparatus according to claim 12,
wherein, in a case in which it is determined that all the subjects have movement and information on the movement amount in the optical axis direction is not able to be acquired, the processor cancels setting of the tracking target for all the subjects.

14. The imaging apparatus according to claim 1,
wherein, after the tracking processing and the auto focus control are started, the processor
calculates focus evaluation values of a plurality of regions in a screen based on the moving image data,
extracts the region in which the same degree of the focus evaluation value as the focus evaluation value of the tracking target is maintained for a third time, and
newly adds and sets the subject present in the extracted region as the tracking target.

15. An imaging apparatus comprising:
an imaging optical system;
an imaging element; and
a processor,
wherein, in a first focus mode, the processor
outputs moving image data captured by the imaging element via the imaging optical system to a display destination,
detects an in-focus region in an image represented by the moving image data based on the moving image data,
detects a focus state of the subject included in the moving image data based on the moving image data, and
senses, in a case in which a focus operation is performed, a termination of the focus operation based on a time related to the focus operation,
sets, in a case in which the termination of the focus operation is sensed, a subject present in the in-focus region, the subject which is changed from an in-focus state to an out-of-focus state during the focus operation and then restored to the in-focus state, as a tracking target to continuously perform tracking processing and auto focus control, and
terminates, in a case in which the focus operation is performed again after the tracking processing and the auto focus control are started, the tracking processing and the auto focus control,
wherein after determining that a restoration operation of changing from the in-focus state to the out-of-focus state and then restoring to the in-focus state immediately after a blurriness in the focus operation is performed, the subject which is the in-focus state is set as the tracking target by the restoration operation.

16. The imaging apparatus according to claim 15,
wherein, in a case in which the subject, which is changed from the in-focus state to the out-of-focus state during the focus operation and then restored to the in-focus state, is not present, the processor sets the subject having a longest period of the in-focus state during the focus operation as the tracking target.

17. The imaging apparatus according to claim 15,
wherein the time related to the focus operation is a time of a non-operation state.

18. The imaging apparatus according to claim 15,
wherein the processor gives information indicating the in-focus region to the image represented by the moving image data to output the moving image data to the display destination.

19. The imaging apparatus according to claim 15,
wherein the processor
acquires information on a posture of an apparatus body, and
terminates, in a case in which the posture of the apparatus body is changed after the tracking processing and the auto focus control are started, the tracking processing and the auto focus control.

20. The imaging apparatus according to claim 15,
wherein, in a case in which a plurality of the subjects are set as the tracking targets, the processor
calculates a movement amount of each of the subjects, and
sets the tracking target based on the calculated movement amount.

21. The imaging apparatus according to claim 15,
wherein, after the tracking processing and the auto focus control are started, the processor
calculates focus evaluation values of a plurality of regions in a screen based on the moving image data,
extracts the region in which the same degree of the focus evaluation value as the focus evaluation value of the tracking target is maintained for a third time, and
newly adds and sets the subject present in the extracted region as the tracking target.

22. An imaging control method comprising:
detecting an in-focus region in an image represented by moving image data captured by an imaging element via an imaging optical system based on the moving image data;
sensing, in a case in which a focus operation is performed, a termination of the focus operation based on a time related to the focus operation;
sensing a movement direction of a focus immediately before the termination of the focus operation is sensed;
setting, in a case in which the termination of the focus operation is sensed, a subject present in the in-focus region as a tracking target to continuously perform tracking processing and auto focus control, and limiting the movement direction of the focus by the auto focus control to the movement direction of the focus immediately before the termination of the focus operation is sensed, in a period from starts of the tracking processing and the auto focus control until a second time elapses; and
terminating, in a case in which the focus operation is performed again after the tracking processing and the auto focus control are started, the tracking processing and the auto focus control.

23. A non-transitory, computer-readable tangible recording medium on which a program for causing a computer to execute the imaging control method according to claim 22 is recorded.

24. An imaging control method comprising:
detecting an in-focus region in an image represented by moving image data captured by an imaging element via an imaging optical system based on the moving image data;
detecting a focus state of the subject included in the moving image data based on the moving image data, and
sensing, in a case in which a focus operation is performed, a termination of the focus operation based on a time related to the focus operation;
setting, in a case in which the termination of the focus operation is sensed, a subject present in the in-focus region, the subject which is changed from an in-focus state to an out-of-focus state during the focus operation and then restored to the in-focus state, as a tracking target to continuously perform tracking processing and auto focus control; and
terminating, in a case in which the focus operation is performed again after the tracking processing and the auto focus control are started, the tracking processing and the auto focus control,
wherein after determining that a restoration operation of changing from the in-focus state to the out-of-focus state and then restoring to the in-focus state immediately after a blurriness in the focus operation is performed, the subject which is the in-focus state is set as the tracking target by the restoration operation.

25. A non-transitory, computer-readable tangible recording medium on which a program for causing a computer to execute the imaging control method according to claim 24 is recorded.

* * * * *